(12) United States Patent
Gao et al.

(10) Patent No.: US 12,484,056 B2
(45) Date of Patent: Nov. 25, 2025

(54) MULTI-DCI BASED PDSCH SCHEDULING FOR URLLC

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA)

(73) Assignee: Telefonaktiebolaget LM Ericsson (pub!), Stockholm (SE)

( * ) Notice: Subject to any disclaimer, the term of this patent is extended or adjusted under 35 U.S.C. 154(b) by 449 days.

(21) Appl. No.: 17/912,542

(22) PCT Filed: Mar. 18, 2021

(86) PCT No.: PCT/IB2021/052298
§ 371 (c)(1),
(2) Date: Sep. 19, 2022

(87) PCT Pub. No.: WO2021/186400
PCT Pub. Date: Sep. 23, 2021

(65) Prior Publication Data
US 2023/0132212 A1    Apr. 27, 2023

Related U.S. Application Data

(60) Provisional application No. 62/991,320, filed on Mar. 18, 2020.

(51) Int. Cl.
*H04W 72/1273* (2023.01)
*H04L 1/1812* (2023.01)
*H04L 5/00* (2006.01)

(52) U.S. Cl.
CPC ....... *H04W 72/1273* (2013.01); *H04L 1/1812* (2013.01); *H04L 5/0055* (2013.01)

(58) Field of Classification Search
CPC ... H04W 28/04; H04W 72/04; H04W 72/042; H04W 88/08; H04W 72/1273; H04L 5/0007; H04L 1/1812; H04L 5/0055
(Continued)

(56) References Cited

U.S. PATENT DOCUMENTS 11,711,192 B2 * 7/2023 Papasakellariou .... H04L 1/1861
370/329
2016/0381690 A1 * 12/2016 Kim ..................... H04W 72/541
370/329
(Continued)

FOREIGN PATENT DOCUMENTS

WO   WO 2018/194352 A1 * 10/2018   ............ H04W 52/32
WO   WO 2018/200748 A1 * 11/2018   ............ H04W 72/04
(Continued)

OTHER PUBLICATIONS

3GPP TSG RAN WG1 #98, Prague, CZ, Aug. 26-30, 2019, R1-1908166, Source: vivo, Title: Remaining issues on multi-TRP /Panel transmission, Agenda Item: 7.2.8.2. (Year: 2019).*
(Continued)

*Primary Examiner* — Peter G Solinsky
*Assistant Examiner* — Sanjay K Dewan
(74) *Attorney, Agent, or Firm* — Sonoda & Kobayashi Intellectual | Property Law; Darren M. Gardner

(57) ABSTRACT

Systems and methods for multiple Downlink Control Information (DCI) based Physical Downlink Shared Channel (PDSCH) scheduling are disclosed herein. In one embodiment, a method performed by a User Equipment (UE) comprises receiving first and second Physical Downlink Control Channels (PDCCHs) carrying first and second DCIs in first and second Control Resource Sets (CORESETs) in first and second time periods (t1, t2), respectively, wherein t1≤t2. The method further comprises receiving first and
(Continued)

second PDSCHs scheduled by the first and second DCIs in third and fourth time periods (t3, t4), respectively, wherein the first and second PDSCHs are associated with a same Hybrid Automatic Repeat Request (HARQ) process and a same Transport Block (TB), and t3≤t4. The method further comprises sending first and second HARQ ACK/NACKs in first and second Physical Uplink Control Channel (PUCCH) resources in fifth and sixth time periods (t5, t6), respectively, wherein t5≤t6 and t4≤t5.

20 Claims, 17 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2018/0343653 | A1* | 11/2018 | Guo ...................... | H04B 7/088 |
| 2019/0082456 | A1* | 3/2019 | Kim .................... | H04L 27/2602 |
| 2019/0246378 | A1* | 8/2019 | Islam .................... | H04L 1/1819 |
| 2020/0015229 | A1* | 1/2020 | Yang ..................... | H04L 5/0055 |
| 2023/0096999 | A1* | 3/2023 | Zhang .................. | H04L 1/1887 |
| | | | | 370/329 |
| 2023/0139269 | A1* | 5/2023 | MolavianJazi ....... | H04W 72/23 |
| | | | | 370/329 |
| 2023/0155789 | A1* | 5/2023 | Zhang .................. | H04L 5/0055 |
| | | | | 370/329 |
| 2023/0199764 | A1* | 6/2023 | Zhu ...................... | H04L 5/0053 |
| | | | | 370/329 |

FOREIGN PATENT DOCUMENTS

| | | | | |
|---|---|---|---|---|
| WO | 201917751 | A1 | 1/2019 | |
| WO | 2019019893 | A1 | 1/2019 | |
| WO | WO 2019/017751 | A1 * | 1/2019 | ............... H04L 5/00 |
| WO | WO 2019/01909893 | A1 * | 1/2019 | ............ H04L 5/0098 |
| WO | 2019032882 | A1 | 2/2019 | |
| WO | WO 2019/031850 | A1 * | 2/2019 | ............ H04W 72/23 |
| WO | 2019050367 | A1 | 3/2019 | |
| WO | WO 2019/201459 | A1 * | 10/2019 | ............... H04L 1/18 |
| WO | 2020225680 | A1 | 11/2020 | |

OTHER PUBLICATIONS

3GPP TSG-RAN WG1 Meeting #96, Feb. 25-Mar. 1, 2019, Athens, Greece, R1-1903043, Agenda item: 7.2.8.2, Source: Qualcomm Incorporated, Title: Multi-TRP Enhancements. (Year: 2019).*
3GPP TSG RAN WG1 Meeting #94bis, Chengdu, China, Oct. 8-12, 2018, R1-1811348, Source: NTT Docomo, Inc., Title: Enhancements on multi-TRP/panel transmission, Agenda Item: 7.2.8.2. (Year: 2018).*
3GPP TSG RAN WG1 #98, Prague, CZ, Aug. 26-30, 2019, R1-1908166, Source: vivo, Title: Remaing issues on multi-TRP/ Panel transmission, Agenda Item: 7.2.8.2. (Year: 2019).*
3GPP TSG RAN WG1 Meeting #94bis, Chengdu, China, Oct. 8-12, 2018, R1-1810104, Agenda Item: 7.2.8.2, Source: Huawei, HiSilicon, Title: Enhancements on multi-TRP/panel transmission. (Year: 2018).*
Non-Final Office Action for U.S. Appl. No. 17/608,544, mailed Jan. 24, 2024, 13 pages.
Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
Huawei, et al., "R1-1810104: Enhancements on multi-TRP/panel transmission," 3GPP TSG RAN WG1 Meeting #94bis, Oct. 8-12, 2018, Chengdu, China, 17 pages.
NTT Docomo, Inc., et al., "R1-1811348: Enhancements on multi-TRP/panel transmission," 3GPP TSG RAN WG1 Meeting #94bis, Oct. 8-12, 2018, Chengdu, China, 21 pages.
Qualcomm Incorporated, "R1-1903043: Multi-TRP Enhancements," 3GPP TSG-RAN WG1 Meeting #96, Feb. 25-Mar. 1, 2019, Athens, Greece, 30 pages.
Vivo, "R1-1908166: Remaining issues on multi-TRP/Panel transmission," 3GPP TSG RAN WG1 #98, Aug. 26-30, 2019, Prague, Czech Republic, 18 pages.
International Search Report and Written Opinion for International Patent Application No. PCT/IB2020/054123, mailed Jul. 23, 2020, 16 pages.
International Search Report and Written Opinion for International Patent Application No. PCT/IB2021/052298, mailed Jun. 22, 2021, 18 pages.

* cited by examiner (a) Repeating a same HARQ A/N after joint decoding in two PUCCH resources (b) HARQ A/N in PUCCH1 for PDSCH1 and HARQ A/N in PUCCH2 for joint decoding

MULTI-DCI BASED PDSCH SCHEDULING FOR URLLC

RELATED APPLICATIONS

This application is a 35 U.S.C. § 371 national phase filing of International Application No. PCT/IB2021/052298, filed Mar. 18, 2021, which claims the benefit of provisional patent application Ser. No. 62/991,320, filed Mar. 18, 2020, the disclosures of which are hereby incorporated herein by reference in their entireties.

TECHNICAL FIELD

The present disclosure relates to a cellular communications system and, more specifically, to Physical Downlink Shared Channel (PDSCH) scheduling in a cellular communication system.

BACKGROUND

New Radio (NR) Frame Structure and Resource Grid

NR uses Cyclic Prefix Orthogonal Frequency Division Multiplexing (CP-OFDM) in both downlink (i.e. from a network node, gNB, or base station, to a user equipment or UE) and uplink (i.e. from UE to gNB). Discrete Fourier Transform (DFT) spread OFDM is also supported in the uplink. In the time domain, NR downlink and uplink are organized into equally sized subframes of 1 millisecond (ms) each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

Data scheduling in NR is typically on a slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times 2^{\mu})$ kHz where $\mu \in 0, 1, 2, 3, 4$. $\Delta f=15$ kHz is the basic subcarrier spacing. The slot durations at different subcarrier spacings is given by $1/2^{\mu}$ ms.

In the frequency domain, a system bandwidth is divided into Resource Blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions are dynamically scheduled, i.e., in each slot the gNB transmits Downlink Control Information (DCI) over Physical Downlink Control Channel (PDCCH) about which UE data is to be transmitted to and which RBs in the current downlink slot the data is transmitted on. The UE data are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not fully connected to the network while DCI format 1_1 can be used for scheduling Multiple-Input-Multiple-Output (MIMO) transmissions with two Transport Blocks (TBs). DCI format 1_2 is introduced in NR Release 16 (Rel-16) to support configurable size for certain bit fields in the DCI.

A UE first detects and decodes PDCCH and, if the decoding is successful, it then decodes the corresponding PDSCH based on the decoded control information in the PDCCH.

Uplink data transmissions are also dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

Quasi Co-Location (QCL) and Transmission Configuration Indicator (TCI) States Several signals can be transmitted from different antenna ports of a same base station. These signals can have the same large-scale properties such as Doppler shift/spread, average delay spread, or average delay. These antenna ports are then said to be quasi co-located or "QCL".

If the UE knows that two antenna ports are QCL with respect to a certain parameter (e.g. Doppler spread), the UE can estimate that parameter based on one of the antenna ports and apply that estimate for receiving signal on the other antenna port. Typically, the first antenna port is represented by a measurement reference signal such as Channel State Information Reference Signal (CSI-RS) or Synchronization Signal Block (SSB) (known as source RS), and the second antenna port is a Demodulation Reference Signal (DMRS or DM-RS) (known as target RS).

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

For dynamic beam and Transmission and Reception Point (TRP) selection, a UE can be configured through Radio Resource Control (RRC) signaling with up to 128 TCI states for PDSCH in frequency range 2 (FR2) and up to 8 TCI states in frequency range 1 (FR1), depending on UE capability.

Each TCI state contains QCL information, i.e., one or two source downlink (DL) RSs, where each source RS is associated with a QCL type. For example, a TCI state contains a pair of reference signals, each associated with a QCL type, e.g., two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e. the RX beam to use) from CSI-RS2.

The list of TCI states can be interpreted as a list of possible beams transmitted from the network or a list of possible TRPs used by the network to communicate with the UE.

For PDSCH transmission, up to 8 TCI states or pair of TCI states may be activated and a UE may be dynamically indicated by a TCI codepoint in DCI one or two of the activated TCI states for PDSCH reception. The UE uses the TCI-State according to the value of the 'Transmission Configuration Indication' field in the detected PDCCH with DCI for determining PDSCH antenna port quasi co-location.

Default TCI State(s)

If all the TCI codepoints of the DCI TCI field are mapped to a single TCI state and the offset between the reception of a DL DCI and the corresponding PDSCH is less than a threshold timeDurationForQCL configured by higher layers, the UE may assume that the DM-RS ports of a PDSCH of a serving cell are QCL with the RS(s) with respect to the QCL parameter(s) used for PDCCH QCL indication of the Control Resource Set (CORESET) associated with a monitored search space with the lowest ControlResourceSetId in the latest slot in which one or more CORESETs within the active Bandwidth Part (BWP) of the serving cell are monitored by the UE.

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of a PDSCH of a serving cell are QCL with the RS(s) with respect to the QCL parameter(s) associated with the TCI states corresponding to the lowest codepoint among the TCI codepoints containing two different TCI states.

CORESET and Search Space

A UE monitors a set of PDCCH candidates in one or more CORESETs on an active DL BWP on each activated serving cell configured with PDCCH monitoring according to corresponding search space sets, where PDCCH monitoring implies decoding each PDCCH candidate according to the monitored DCI formats.

A PDCCH candidate can occupy one or more Control-Channel Elements (CCEs), also referred to as Aggregation Levels (ALs), as indicated in Table 1 below. A CCE consists of 6 resource-element groups (REGs), where a REG equals one RB during one OFDM symbol.

TABLE 1

NR supported PDCCH aggregation levels.

| Aggregation level | Number of CCEs |
|---|---|
| 1 | 1 |
| 2 | 2 |
| 4 | 4 |
| 8 | 8 |
| 16 | 16 |

A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per BWP for monitoring PDCCH candidates.

A search space set is defined over a CORESET. A CORESET consists of $N_{RB}^{CORESET}$ resource blocks in the frequency domain and $N_{smyb}^{CORESET} \in \{1,2,3\}$ consecutive OFDM symbols in the time domain. For each DL BWP configured to a UE in a serving cell, a UE can be provided by higher layer signaling with P≤5 CORESETs. For each CORESET, a UE is configured by RRC signaling with a CORESET information element (IE), which includes the following:

- a CORESET index p, 0≤p<16;
- a DM-RS scrambling sequence initialization value;
- a precoder granularity for a number of resource element groups (REGs) in the frequency domain where the UE can assume use of a same DM-RS precoder;
- a number of consecutive symbols;
- a set of RBs;
- CCE-to-REG mapping parameters;
- a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB;
- an indication for a presence or absence of a transmission configuration indication (TCI) field for DCI format 1_1 transmitted by a PDCCH in CORESET p. This is done by the field 'tci-PresentInDCI'. If the 'tci-PresentInDCI' field is absent in the CORESET IE corresponding to CORESET p, the UE considers the TCI field to be absent/disabled when scheduling is done via DCI format 1_1. The corresponding field for indicating a presence or absence of a TCI field for DCI format 1_2 is given by 'tci-PresentInDCI-ForDCIFormat1_2'.

For each CORESET, only one TCI state is activated by a Medium Access Control (MAC) Control Element (CE).

CORESET Pools and Multi DCI Scheduling

In NR Rel-16, multi-DCI scheduling is introduced in which a UE may receive two DCIs each scheduling a PDSCH in the same slot, even on overlapping resources. A CORESETPOOLIndex can be configured in ControlResourceSet with value 0 or 1 in PDCCH-ConfigIE. The two DCIs and corresponding PDSCHs may be sent to the UE from two different TRPs. The two DCIs are transmitted in two CORESETs belonging to different CORESET pools (i.e., with CORESETPoolIndex 0 and 1 respectively), each pool associated with a different TRP. The two PDSCHs belong to two different Hybrid Automatic Repeat Request (HARQ) processes and may be scheduled as either fully overlapping, partially overlapping, or non-overlapping, in time and frequency resources.

NR HARQ ACK/NACK Feedback Over PUCCH

When receiving a PDSCH in the downlink from a serving gNB at slot n, a UE feeds back a HARQ ACK at slot n+k over a Physical Uplink Control Channel (PUCCH) (c) resource in the uplink to the gNB if the PDSCH is decoded successfully, otherwise, the UE sends a HARQ NACK at slot n+k to the gNB to indicate that the PDSCH is not decoded successfully.

In NR, up to four PUCCH resource sets can be configured to a UE. A PUCCH resource set with pucch-ResourceSetId=0 can have up to 32 PUCCH resources while, for PUCCH resource sets with pucch-ResourceSetId=1 to 3, each set can have up to 8 PUCCH resources. For each PUCCH resource set, a set of PUCCH resource indexes are provided by RRC parameter resourceList. A UE determines the PUCCH resource set to be used for transmission in a slot based on the total number of aggregated Uplink Control Information (UCI) bits to be sent in the slot. The UCI bits consist of HARQ ACK/NACK, Scheduling Request (SR), and Channel State Information (CSI) bits.

A 3 bits PUCCH Resource Indicator (PRI) field in DCI is used to select a PUCCH resource from a determined set of PUCCH resources. The PUCCH resource is directly determined by the PRI when a maximum of eight PUCCH resources are contained in the resource set. If the first set of PUCCH resources (i.e., indicated with pucch-ResourceSetId=0) is determined, and if the number of PUCCH resources provided in resourceList,$R_{PUCCH}$, in the PUCCH resource set is larger than eight, then the UE determines a PUCCH resource with index $r_{PUCCH}$, $0 \leq r_{PUCCH} \leq R_{PUCCH} - 1$, for carrying HARQ-ACK information associated to DCIs the UE received with a value of the PDSCH-to-HARQ_feedback timing indicator field indicating a same slot for the PUCCH transmission, according to this expression:

$$r_{PUCCH} = \begin{cases} \left\lfloor \frac{n_{CCE,p} \lfloor R_{PUCCH}/8 \rfloor}{N_{CCE,p}} \right\rfloor + \Delta_{PRI} \cdot \left\lceil \frac{R_{PUCCH}}{8} \right\rceil & \text{if } \Delta_{PR} < R_{PUCCH} \bmod 8 \\ \left\lfloor \frac{n_{CCE,p} \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in CORESET p of a PDCCH reception for a last DCI among the DCIs associated to the same PUCCH resource as described in Subclause 10.1 of 3GPP Technical Specification (TS) 38.213 v15.4.0, $n_{CCE,p}$ is the index of a first CCE for the PDCCH reception, and $\Delta_{PRI}$ is a value of the PUCCH resource indicator field in the last DCI. The DCIs can be with DCI format 1_0, DCI format 1_1, or DCI format 1_2. For $R_{PUCCH} \leq 8$, the PUCCH resource can be determined solely by $\Delta_{PRI}$. When $R_{PUCCH} > 8$, the PUCCH resource set is divided into eight subsets of PUCCH resources and $\Delta_{PRI}$ is used to select one out of the eight subsets of PUCCH resources. Within a selected subset of PUCCH resources, a PUCCH resource is further determined by the index of the first CCE over which the last DCI is detected in a CORESET. An example is shown in FIG. 3, where $R_{PUCCH}=16$, $\Delta_{PRI}=3$, $N_{CCE,p}=12$, and $n_{CCE,p}=4$. In this case, the resource set is divided into 8 subsets each contains two PUCCH resources. A subset is first determined by the value of $\Delta_{PRI}$. In this case, subset 3 is determined. Within the determined subset, if the first CCE is located in the first half of a CORESET, the first PUSCH resource in the subset is selected. Otherwise, if it is in the other half of the CORESET, the second PUCCH resource in the subset is selected. In this example, the 1$^{st}$ CCE is CCE4 and is in the first half of the CCEs, so PUCCH resource 6 is determined.

Ultra-Reliable Low Latency (URLLC) Data Transmission Over Multiple TRPs

More reliable PDSCH transmission utilizing multiple panels or TRPs has been introduced in 3GPP for NR Rel-16, in which a single DCI is used to schedule a transport block transmitted over multiple TRPs to achieve additional diversity. Different schemes are supported.

Reliability is achieved by transmitting different layers of an encoded codeword (CW) for a TB on the same resource over two TRPs (Scheme 1a), or different part of a CW on different frequency resources over two TRPs (FDM Scheme A), or by repeating the same TB over two TRPs in time domain (TDM Schemes A and B) or frequency domain (FDM Scheme B). In all these schemes, two TCI states are indicated in the DCI scheduling the PDSCH. Only single DCI based scheduling is supported, i.e. one PDCCH scheduling multiple PDSCH transmissions of a TB over two TRPs.

In Rel-16, such multi-TRP transmission for reliability is supported for PDSCH only. For NR Rel-17, it has been proposed to further introduce PDCCH enhancement with multiple TRPs by repeating a PDCCH from different TRPs as shown in FIG. 4A.

Some methods were proposed including:
1. CCE interleaving across TRP/CORESET, in which a PDCCH with aggregation level L is mapped to two CORESETs each associated with one TRP with half of the PDCCH symbols mapped to the same L/2 CCEs in each of the two CORESETs
2. PDCCH repetition without soft combining, in which a PDCCH is repeated (in whole) over two CORESETs each associated with one TRP, the PDCCH is considered successfully decoded if any one repetition is decoded successfully. No soft combining of the two repetitions is performed at the hence the two transmissions are independent.
3. PDCCH repetition with soft combining, in which a whole PDCCH is repeated over two CORESETs each associated with one TRP, soft combining of the PDCCH soft bits from decoder from multiple repetitions is performed before PDCCH decoding PUCCH enhancement with multiple TRPs has also been proposed for NR Rel-17 by repeating a PUCCH towards to different TRPs as shown in FIG. 4B.

In Uplink (UL), there is no QCL relation for the transmissions (in DL, a source RS from each TRP is associated with each CORESET to enable multi-TRP reception). Instead, spatial relations are used in UL. Repetition in UL towards different TRPs is therefore related to having multiple spatial relations configured, for the different UL transmission repetitions, to enable reception at different TRPs. A spatial relation configuration for a UL signal or channel comprises (and in some embodiments consists of) a reference signal (e.g., CSI-RS, SSB, or a UL sounding signal or SRS) that the UL signal or channel is related to in terms of spatial transmit filter or direction, a DL reference signal (e.g., CSI-RS, SSB) for pathloss measurement, and parameters for transmit power control.

Some methods were proposed including (a) using RRC to semi-statically configuring multiple spatial relations for a PUCCH resource used for HARQ-ACK transmission to multiple TRPs, where each spatial relation is associated to one TRP; (b) MAC CE selection of multiple spatial relations from a list of RRC configured spatial relations for PUCCH resource for HARQ-ACK transmission to multiple TRPs; and (c) jointly indicating multiple spatial relations by DCI and RRC.

In NR, with regards to two PDSCHs scheduled with the same HARQ process, the following scheduling limitation is captured in 3GPP TS 38.214:

"The UE is not expected to receive another PDSCH for a given HARQ process until after the end of the expected transmission of HARQ-ACK for that HARQ process"

The above scheduling limitation is pictorially depicted in FIG. 5 (time flow is from left to right), where PDSCH1 and PDSCH2 are scheduled to the UE, where the two PDSCHs are associated with the same HARQ process ID x and are possibly scheduled with different redundancy versions (RVs) enabling soft combining. However, according to the scheduling limitation above, PDSCH2 can only be received by the UE once the HARQ ACK/NACK corresponding to PDSCH1 is transmitted in PUCCH1.

Problems with Existing Solutions

There currently exist certain challenge(s). There are a number of problems with introducing PDCCH repetition, which need to be addressed.

SUMMARY

Systems and methods for multiple Downlink Control Information (DCI) based Physical Downlink Shared Channel (PDSCH) scheduling are disclosed herein. In one embodiment, a method performed by a User Equipment (UE) for reliable data transmission with multiple DCI messages scheduling multiple PDSCH transmissions for a same Transport Block (TB) in a cellular communications system comprises receiving a first Physical Downlink Control Channel (PDCCH) carrying a first DCI message in a first Control Resource Set (CORESET) in a first time period (t1) and a second PDCCH carrying a second DCI message in a second CORESET in a second time period (t2) wherein t1≤t2. The method further comprises receiving a first PDSCH scheduled by the first DCI message in a third time period (t3) and a second PDSCH scheduled by the second DCI message in a fourth time period (t4), wherein the first PDSCH and the second PDSCH are associated with a same Hybrid Automatic Repeat Request (HARQ) process and a same TB, and t3≤t4. The method further comprises sending a first HARQ ACK/NACK in a first Physical Uplink Control Channel (PUCCH) resource according to a first configured PUCCH spatial relation in a fifth time period (t5) and a second HARQ ACK/NACK in a second PUCCH resource according to a second configured PUCCH spatial relation in a sixth time period (t6) wherein t5≤t6 and t4≤t5.

In one embodiment, the second PDSCH is received before the first HARQ ACK/NACK is sent.

In one embodiment, the first CORESET and the second CORESET are configured with a first Transmission Configuration Indicator (TCI) state and a second TCI state, respectively. In one embodiment, the first TCI state and the second TCI state are different. In one embodiment, a third TCI state is indicated in the first DCI message for the first PDSCH, a fourth TCI state is indicated in the second DCI message for the second PDSCH, and the third and the fourth TCI states are different. In one embodiment, the first TCI state is the same as the third TCI state, and the second TCI state is the same as the fourth TCI state.

In one embodiment, a same HARQ process identifier is indicated in the first DCI message and the second DCI message, thereby associating the first PDSCH and the second PDSCH with the same HARQ process. In one embodiment, a same New Data Indicator (NDI) is comprised in the first and second DCI messages. In one embodiment, the method further comprises determining (1206) that the first and second PDSCH carry the same TB.

In one embodiment, the first PUCCH resource is determined by at least a first PUCCH resource indicator (PRI) in the first DCI message, and the second PUCCH resource is determined by at least a second PRI in the second DCI message.

In one embodiment, the first configured PUCCH spatial relation and the second configured PUCCH spatial relation are different.

In one embodiment, the method further comprises receiving a configuration of the first configured PUCCH spatial relation and the second configured PUCCH spatial relation, each comprising a reference signal indicating a transmit direction and/or a spatial filter to use, a downlink reference signal for pathloss calculation, and power control parameters.

In one embodiment, the method further comprises receiving a Radio Resource Control (RRC) configuration of a list of TCI states for PDSCH.

In one embodiment, the method further comprises receiving a RRC configuration of one or more TCI states for the first CORESET and one or more TCI states for the second CORESET.

In one embodiment, the method further comprises receiving a TCI state activation Medium Access Control (MAC) Control Element (CE) in activating a subset of TCI states for PDSCH including the third TCI state and the fourth TCI state from the list of TCI states.

In one embodiment, the method further comprises receiving a first TCI state activation MAC CE in activating the first TCI state for the first CORESET and a second MAC CE in activating the second TCI state for the second CORESET.

In one embodiment, the first HARQ ACK/NACK is associated to the first PDSCH, and the second HARQ ACK/NACK is associated to the second PDSCH.

In one embodiment, the second HARQ ACK/NACK is associated to both the first PDSCH and the second PDSCH, wherein an ACK is sent if one of the first PDSCH and the second PDSCH is decoded successfully.

In one embodiment, the first PUCCH resource and the second PUCCH resource are the same or different.

In one embodiment, the first PDSCH and the second PDSCH are decoded independently.

In one embodiment, the second PDSCH is decoded by combining the first PDSCH and the second PDSCH.

In one embodiment, the method further comprises receiving a configuration that indicates to the UE that the UE is to expect to receive two or more PDSCHs scheduled by two or more DCI messages.

In one embodiment, the method further comprises receiving a configuration that indicates a first CORESET pool and a second CORESET pool, and the first CORESET and the second CORESET belong to the first CORESET pool and the second CORESET pool, respectively.

In one embodiment, the method further comprises receiving a first Downlink Allocation Indicator (DAI) in the first DCI and a second DAI in the second DCI, wherein the first and the second DAI can be the same or different.

In one embodiment, the same or different modulation and coding schemes (MCSs) and/or different redundancy versions (RVs) and/or different time and frequency resource allocations and/or different spatial layers are indicated in the first and the second DCI messages.

Corresponding embodiments of a UE are also disclosed. In one embodiment, a UE for reliable data transmission with multiple DCI messages scheduling multiple PDSCH transmissions for a same TB in a cellular communications system is adapted to receive a first PDCCH carrying a first DCI message in a first CORESET in a first time period (t1) and a second PDCCH carrying a second DCI message in a second CORESET in a second time period (t2), wherein t1≤t2. The UE is further adapted to receive a first PDSCH scheduled by the first DCI message in a third time period (t3) and a second PDSCH scheduled by the second DCI message in a fourth time period (t4), wherein the first PDSCH and the second PDSCH are associated with a same HARQ process and a same TB, and t3≤t4. The UE is further adapted to send a first HARQ ACK/NACK in a first PUCCH resource according to a first configured PUCCH spatial relation in a fifth time period (t5) and a second HARQ ACK/NACK in a second PUCCH resource according to a second configured PUCCH spatial relation in a sixth time period (t6), wherein t5≤t6 and t4≤t5.

In another embodiment, a UE for reliable data transmission with multiple DCI messages scheduling multiple PDSCH transmissions for a same TB in a cellular communications system comprises one or more transmitters, one or more receivers, and processing circuitry associated with the one or more transmitters and the one or more receivers. The processing circuitry is configured to cause the UE to receive a first PDCCH carrying a first DCI message in a first CORESET in a first time period (t1) and a second PDCCH carrying a second DCI message in a second CORESET in a second time period (t2), wherein t1≤t2. The processing circuitry is further configured to cause the UE to receive a first PDSCH scheduled by the first DCI message in a third time period (t3) and a second PDSCH scheduled by the second DCI message in a fourth time period (t4), wherein the first PDSCH and the second PDSCH are associated with a same HARQ process and a same TB, and t3≤t4. The processing circuitry is further configured to cause the UE to send a first HARQ ACK/NACK in a first PUCCH resource according to a first configured PUCCH spatial relation in a fifth time period (t5) and a second HARQ ACK/NACK in a second PUCCH resource according to a second configured PUCCH spatial relation in a sixth time period (t6), wherein t5≤t6 and t4≤t5.

Embodiments of a method performed by one or more transmission and reception points (TRPs) are disclosed. In one embodiment, the method comprises transmitting, to a UE, a first PDCCH carrying a first DCI message in a first CORESET in a first time period (t1) and a second PDCCH carrying a second DCI message in a second CORESET in a second time period (t2), wherein t1≤t2. The method further comprises transmitting, to the UE, a first PDSCH scheduled by the first DCI message in a third time period (t3) and a second PDSCH scheduled by the second DCI message in a fourth time period (t4), wherein the first and the second PDSCH are associated with a same HARQ process and a same TB, and t3≤t4. The method further comprises receiving, from the UE, a first HARQ ACK/NACK in a first PUCCH resource with a first configured spatial relation in a fifth time period (t5) and a second HARQ ACK/NACK in a second PUCCH resource with a second configured spatial relation in a sixth time period (t6), wherein t5≤t6 and t4≤t5.

In one embodiment, the second PDSCH is sent before receiving the first HARQ ACK/NACK.

In one embodiment, the first CORESET and the second CORESET are configured with a first TCI state and a second TCI state, respectively. In one embodiment, the first TCI state and the second TCI state are different. In one embodiment, a third TCI state is indicated in the first DCI message for the first PDSCH, a fourth TCI state is indicated in the second DCI message for the second PDSCH, and the third TCI state and the fourth TCI state are different. In one embodiment, the first TCI state is the same as the third TCI state, and the second TCI state is the same as the fourth TCI state.

In one embodiment, a same HARQ process identifier is indicated in the first DCI message and the second DCI message, thereby associating the first PDSCH and the second PDSCH with the same HARQ process. In one embodiment, a same NDI is comprised in the first DCI message and the second DCI message.

In one embodiment, the first PUCCH resource is indicated by at least a first PRI in the first DCI message, and the second PUCCH resource is indicated by at least a second PRI in the second DCI message.

In one embodiment, the first spatial relation and the second spatial relation are different.

In one embodiment, the method further comprises sending an TCI activation MAC CE in activating the first spatial relation and the second spatial relation each containing a reference signal for indicating a transmit direction and/or a spatial filter to use, a downlink reference signal for pathloss calculation, and power control parameters.

In one embodiment, the first HARQ ACK/NACK is associated to the first PDSCH, and the second HARQ ACK/NACK is associated to the second PDSCH.

In one embodiment, the second HARQ ACK/NACK is associated to both the first PDSCH and the second PDSCH, wherein an ACK is received if one of the first PDSCH and the second PDSCH is decoded successfully.

In one embodiment, the first and the second PUCCH resources are the same or different.

In one embodiment, the first PDSCH and the second PDSCH are assumed to be decoded independently at the UE.

In one embodiment, the second PDSCH is assumed to be decoded by combining the first PDSCH and the second PDSCH at the UE.

In one embodiment, the method further comprises sending, to the UE, a configuration that indicates to the UE that the UE is to expect to receive two or more PDSCHs scheduled by two or more DCI messages.

In one embodiment, the method further comprises sending, to the UE, a configuration that indicates a first CORESET pool and a second CORESET pool, and the first CORESET and the second CORESET belong to the first CORESET pool and the second CORESET pool, respectively.

In one embodiment, the method further comprises sending, to the UE, a configuration about the first spatial relation and the second spatial relation associated with the first PUCCH resource and the second PUCCH resource, respectively.

In one embodiment, different MCSs and/or different RVs and/or different time and frequency resource allocations and/or different spatial layers are indicated in the first DCI message and the second DCI message.

A corresponding system is also disclosed. In one embodiment, a system comprising one or more TRPs is provided, wherein the one or more TRPs are adapted to transmit, to a UE, a first PDCCH carrying a first DCI message in a first CORESET in a first time period (t1) and a second PDCCH carrying a second DCI message in a second CORESET in a second time period (t2), wherein t1≤t2. The one or more TRPs are further adapted to transmit, to the UE, a first PDSCH scheduled by the first DCI message in a third time period (t3) and a second PDSCH scheduled by the second DCI message in a fourth time period (t4), wherein the first and the second PDSCH are associated with a same HARQ process and a same TB, and t3≤t4. The one or more TRPs are further adapted to receive, from the UE, a first HARQ ACK/NACK in a first PUCCH resource with a first configured spatial relation in a fifth time period (t5) and a second HARQ ACK/NACK in a second PUCCH resource with a second configured spatial relation in a sixth time period (t6), wherein t5≤t6 and t4≤t5.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
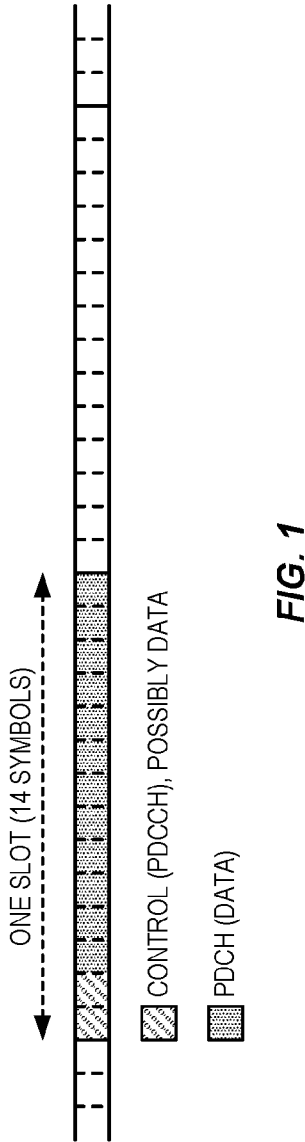
FIG. 1 illustrates a 14-symbol New Radio (NR) slot.
Figure 2:
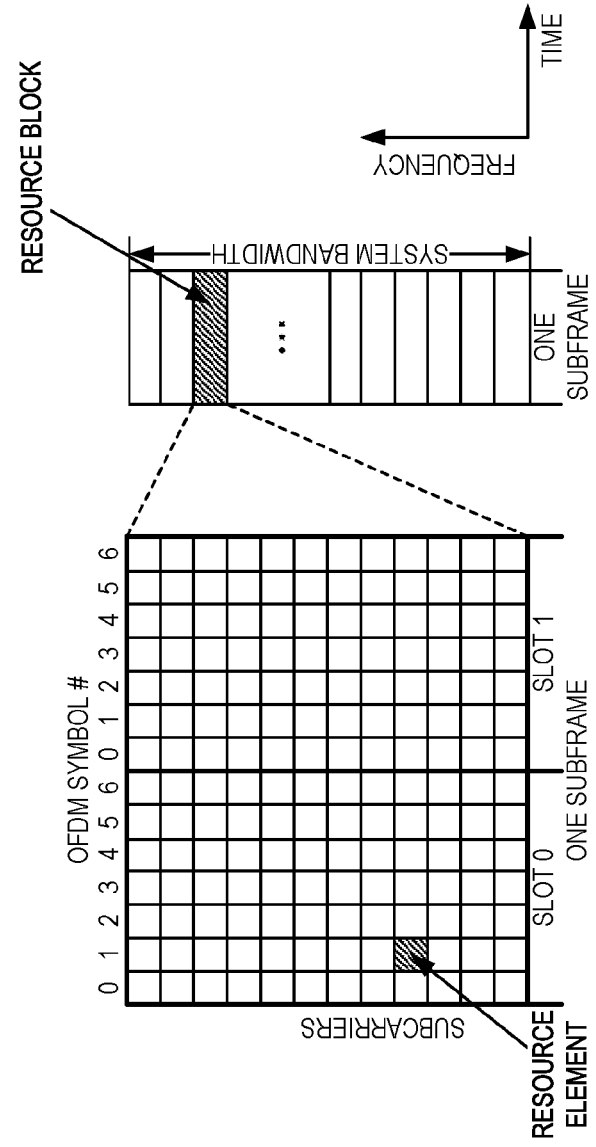
FIG. 2 illustrates the basic NR physical time-frequency resource grid.
Figure 3:
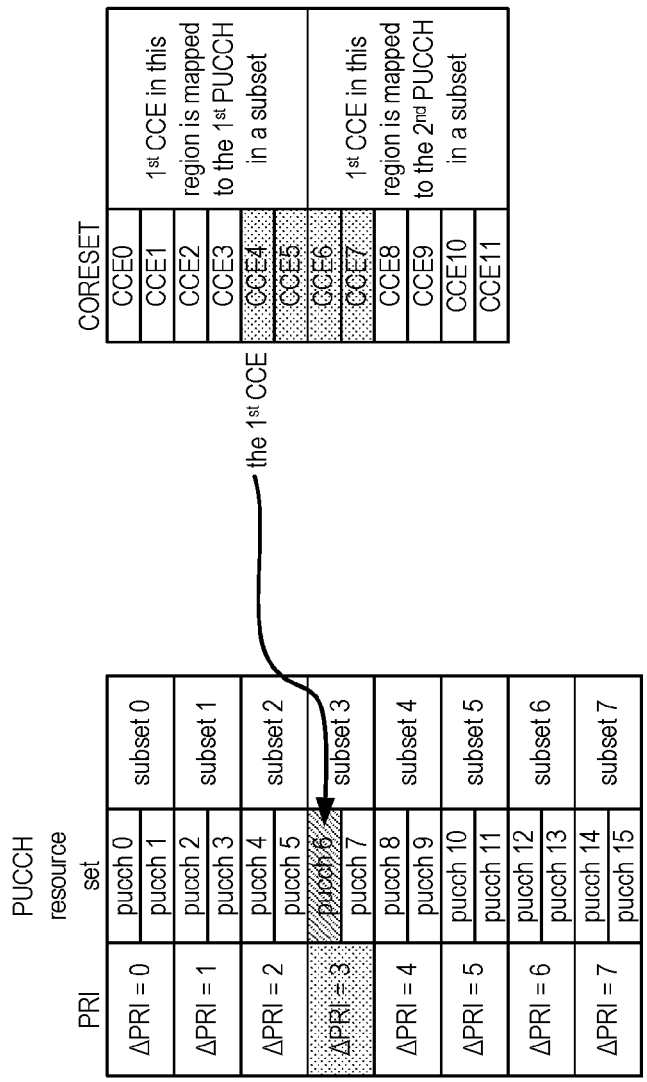
FIG. 3 illustrates an example of a Physical Uplink Control Channel (PUCCH) resource set.
Figure 4A:
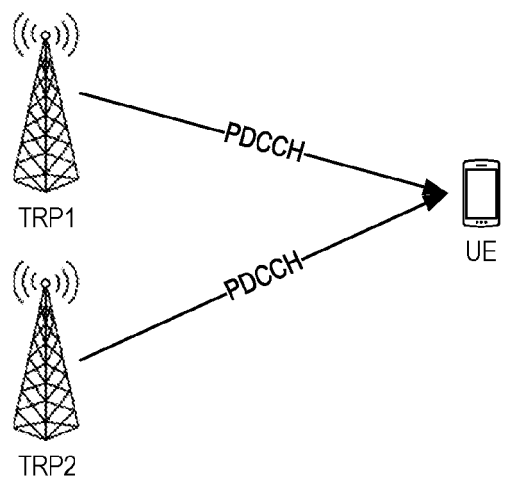
FIG. 4A illustrates repeating a Physical Downlink Control Channel (PDCCH) from multiple Transmission and Reception Points (TRPs)
Figure 4B:
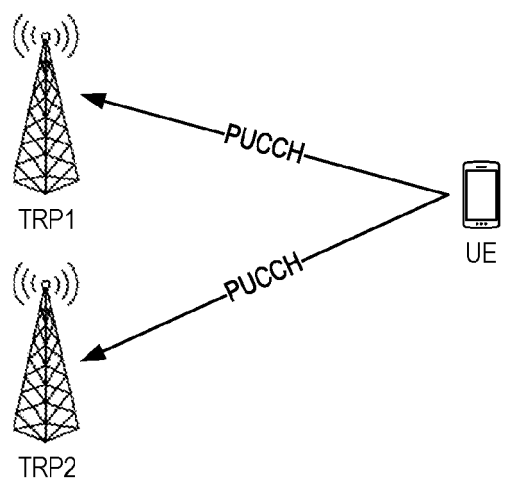
FIG. 4B illustrates repeating a PUCCH towards multiple TRPs.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). There are a number of problems with introducing Physical Downlink Control Channel (PDCCH) repetition in 3GPP NR, which are summarized below.

For PDCCH repetition with soft combining, a UE performs soft combining over multiple PDCCH candidates before decoding the associated Downlink Control Information (DCI). So, the UE needs to know the relationship of the resource locations for the multiple PDCCH occasions in different Control Resource Sets (CORESETs). One problem is how to define the relationship of the resource locations.

When a single DCI schedules multiple Physical Downlink Shared Channel (PDSCH) transmission occasions in Rel-16, the same Modulation and Coding Scheme (MCS) and number of layers is used for the scheduled multiple PDSCHs. This is problematic in scenarios where the channel conditions may be different for multiple TRPs since, ideally, different PDSCHs should use different MCS, to perform link adaptation.

Another problem is how the UE is to determine the time offset between a detected DCI and the corresponding PDSCH if the PDCCH carrying the DCI uses repetitions in Rel-17, as these PDCCH repetitions may be in different symbols and some of the PDCCHs may not be detected by the UE. For example, the position of the last transmitted PDCCH from the gNB and last received PDCCH at the UE may not be the same, which is a problem as there are procedures in NR that relies on the last symbol of the PDCCH.

In addition, in NR, there is a scheduling limitation when two PDSCH5 are scheduled with the same Hybrid Automatic Repeat Request (HARQ) process identity (ID). Then, the second of these two PDSCHs can only be received by the UE once the HARQ ACK/NACK corresponding to the first of these two PDSCHs is transmitted by the UE. This restriction is not suitable for Ultra-Reliable Low-Latency Communication (URLLC) applications with low latency requirements. Hence, another problem is how to allow for two PDSCHs scheduled with the same HARQ process ID with lower latency decoding compared to the legacy Rel-16 procedure.

Certain aspects of the present disclosure and their embodiments may provide solutions to the aforementioned or other challenges. Systems and methods for reliable data transmission with multiple DCIs, each transmitted from a different TRP and scheduling one or more PDSCHs for a same transport block (TB) over multiple TRPs are proposed. In one embodiment, a method of reliable data transmission with multiple DCIs, each transmitted from a different TRP and scheduling one or more PDSCH5 for a same TB over multiple TRPs is provided. In one embodiment, the method comprises:

1. The multiple TRPs transmit the multiple DCIs in a same slot or different slots over a same or different CORESETs.
    In one embodiment, multiple CORESETs are used, and each CORESET is associated with (e.g., transmitted from) a different TRP.
    In one embodiment, the multiple DCIs are transmitted over CORESETs with different Transmission Configuration Indicator (TCI) states, each associated with a TRP.
    In one embodiment, the multiple DCIs may contain the same HARQ process ID.
2. The multiple DCIs schedule multiple PDSCHs for the same TB. The multiple PDSCHs for the same TB may be scheduled in a same slot or different slots and scheduled with different Transmission Configuration Indicator (TCI) states, Modulation and Coding Schemes (MCSs), Redundancy Versions (RVs), and/or number of spatial layers (e.g., different TCI states may imply sent over different TRPs).
    In one embodiment, at the UE to which the DCIs are sent, the multiple PDSCHs may be decoded individually or together with soft combining.
3. The UE transmits separate HARQ ACK/NACK feedback for each PDSCH toward different TRPs on PUCCH resource(s) with different spatial relations. The HARQ ACK/NACK may be determined based on the decoding results of all previously received PDSCHs, including the current PDSCH, for the same TB. For example, if a first PDSCH is correctly decoded while a second PDSCH is not, a HARQ ACK would be reported in PUCCH resource associated to the second PDSCH.

Certain embodiments may provide one or more of the following technical advantage(s). Embodiments of the solution described herein provide diversity for PDCCH, PDSCH, and PUCCH for a same TB over multiple TRPs and are more flexible in adapting to different channel conditions associated with different TRPs by independently scheduling MCS, resource allocation, number of spatial layers, and etc. for each PDSCH.

Figure 6:
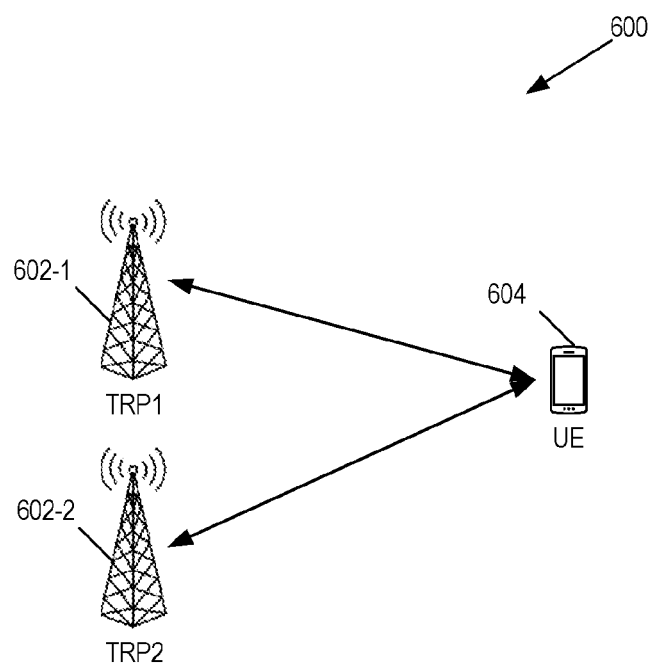
FIG. 6 illustrates one example of a system in which embodiments of the present disclosure may be implemented.

In this regard, FIG. 6 illustrates one example of a system 600 in which embodiments of the present disclosure may be implemented. As illustrated, the system 600 includes a first TRP 602-1 (also denoted herein as TRP1) and a second TRP 602-2 (also denoted herein as TRP2). The system 600 also includes a UE 604 that is enabled to transmit to and receive from the first and second TRPs 602-1 and 602-2.

Multiple PDSCHs Scheduled by Multiple DCIs for the Same TB

As an alternative to PDCCH repetition, embodiments of the present disclosure use different DCIs (also referred to herein as different "DCI messages"), each scheduling one of multiple PDSCHs for a same TB. In other words, multiple DCIs are used to schedule multiple respective PDSCHs for a same TB. In this case, each PDSCH can be scheduled with different parameters. Also, the resources for the corresponding PDCCHs can be independently allocated, and there is no ambiguity regarding the time offset between a detected DCI and its scheduled PDSCH.

However, one issue related to this multi-DCI scheduling multiple PDSCHs for a same TB is how to indicate to the UE 604 that the multiple PDSCHs are associated with the same TB, i.e., contain the same information payload. Another issue is how to send HARQ ACK/NACK feedback associated with the multiple PDSCHs. These issues are further addressed below.

In one embodiment, multiple DCIs each scheduling a PDSCH transmission for a same TB may be sent to the UE 604. In other words, multiple DCIs are sent to the UE 604, where the multiple DCIs schedule multiple PDSCH transmissions, respectively, for a same TB. Hence, pairs of PDCCH+PDSCH are scheduled, with different TCI states, but where the PDSCHs contain the same information payload. Each of the DCIs is carried by a respective PDCCH. Different DCIs and the associated PDSCHs may be transmitted over different TRPs (e.g., TRP 602-1 and TRP 602-2), i.e., each DCI is transmitted by a PDCCH from a CORESET with a TCI state that is different than that of other DCIs of the multiple DCIs. Also, the TCI state used for the scheduled PDSCH is different. One possibility is that the TCI state for the CORESET is also used for the PDSCH, for each PDCCH+PDSCH pair. This provides PDCCH and PDSCH diversity and improves downlink data reliability as the chance that the UE decodes at least one PDCCH+PDSCH pair increases with the number of such pairs.

In one embodiment, the multiple DCIs are sent in a same slot. In a further embodiment, the multiple DCIs are sent over a same PDCCH monitoring occasion or different monitoring occasions in a slot.

In another embodiment, the DCIs are sent in different slots before a HARQ ACK/NACK is received for any one of the scheduled PDSCHs.

In one embodiment, a same HARQ process ID and a same NDI (New Data Indicator) value is contained in the multiple DCIs to indicate to the UE 604 that the corresponding multiple PDSCHs carry a same TB. The RV, MCS, resource allocation, KO (time offset between PDCCH to the corresponding PDSCH), PUSCH Resource Indicator (PRI), TCI state(s), and/or number of layers may be independently configured/indicated for the PDSCHs.

In an alternative embodiment, a parameter is transmitted from the network (e.g., from TRP 602-1 or TRP 602-2) to the UE 604, for example by using RRC signaling, to enable multi-DCI reception where these multiple DCIs schedule multiple PDSCHs, respectively, and each of the multiple PDSCHs contains the same information payload. Hence, the PDSCHs contain encoded bits from the same set of information bits. The encoded bits may not be exactly the same in the multiple PDSCHs, for example, different RVs may be used. So, when this parameter is enabled, the UE 604 can expect to successfully decode multiple PDCCHs that schedule multiple PDSCHs in the same slot, but the UE 604 then assumes that the PDSCHs contain the same information payload (and hence, soft combining is possible in the UE 604).

In one embodiment, the PDSCHs are scheduled on different frequency resources (i.e., in a Frequency Division Multiplexing (FDM) fashion), or on different Orthogonal Frequency Division Multiplexing (OFDM) symbols or slots (i.e., in Time Division Multiplexing (TDM) fashion), or on the same time and frequency resources but different Multiple Input Multiple Output (MIMO) layers (i.e., in Spatial Division Multiplexing (SDM) fashion).

Figure 7:
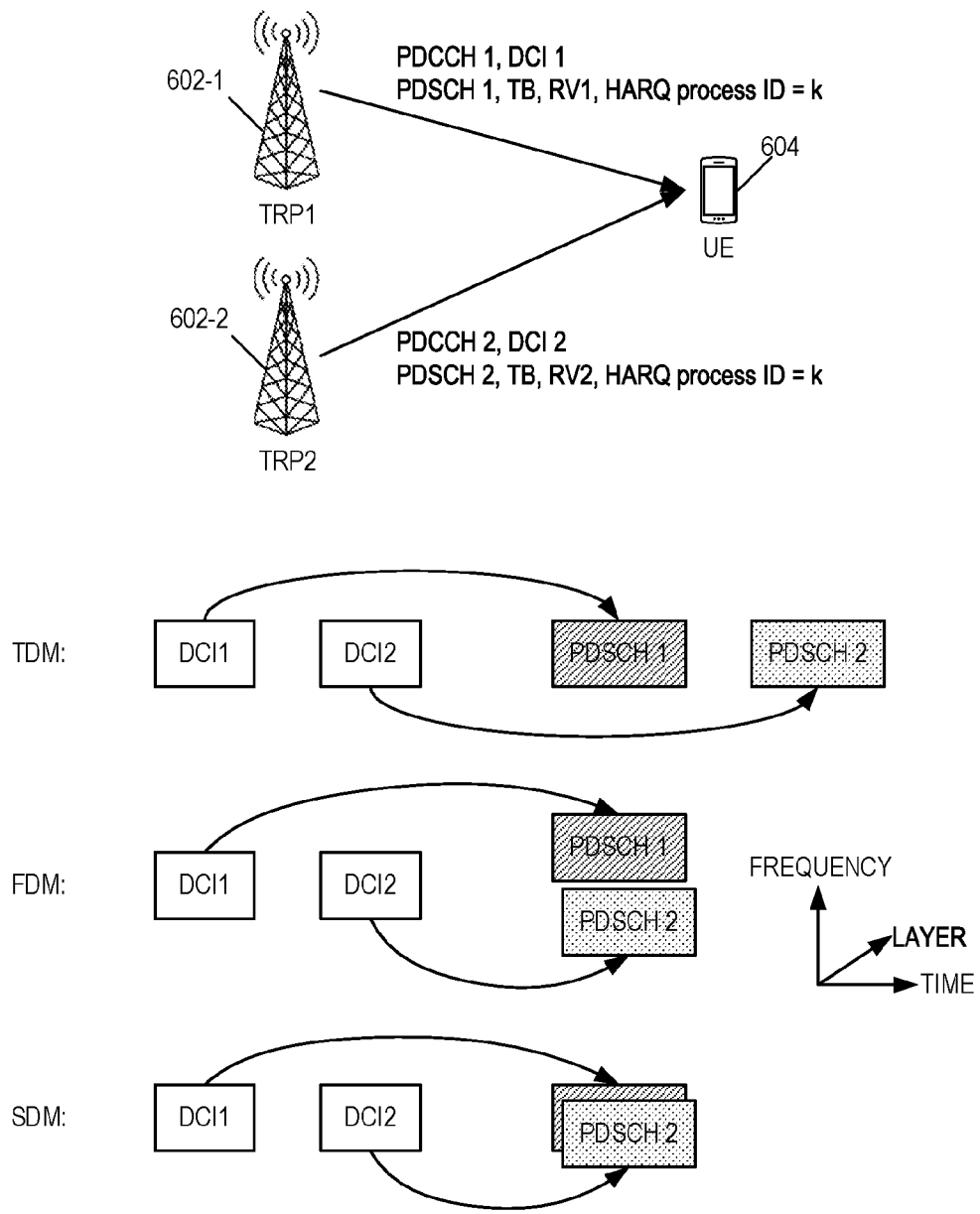
FIG. 7 illustrates three scenarios, namely: (1) a first scenario in which a first PDSCH (PDSCH1) and a second PDSCH (PDSCH2) are scheduled on different frequency resources (i.e., in Frequency Division Multiplexing (FDM) fashion), (2) a second scenario in which PDSCH1 and PDSCH2 are scheduled on different Orthogonal Frequency Division Multiplexing (OFDM) symbols or slots (i.e., in Time Division Multiplexing (TDM) fashion), and (3) a third scenario in which PDSCH1 and PDSCH2 are scheduled on the same time and frequency resources but different Multiple Input Multiple Output (MIMO) layers (i.e., in Spatial Division Multiplexing (SDM) fashion)

An example is shown in FIG. 7, where two TRPs (e.g., TRPs 602-1 and 602-2) are shown. In the illustrated example, a first TRP (TRP1) transmits a first PDCCH (PDCCH1) carrying a first DCI (DCI1) that schedules a first PDSCH (PDSCH1) for a particular TB. In particular, PDSCH1 carries a first RV (RV1) of a particular set of information bits. In addition, the HARQ process ID provided in DCI1 for PDSCH1 is HARQ process ID=k. A second TRP (TRP2) transmits a second PDCCH (PDCCH2) carrying a second DCI (DCI2) that schedules a second PDSCH (PDSCH2) for the same TB. PDSCH2 carries a second RV (RV2) of the particular set of information bits. The HARQ process ID provided in DCI2 for PDSCH2 is also HARQ process ID=k. FIG. 7 shows three scenarios, namely: (1) a first scenario in which PDSCH1 and PDSCH2 are scheduled on different frequency resources (i.e., in FDM fashion), (2) a second scenario in which PDSCH1 and PDSCH2 are scheduled on different OFDM symbols or slots (i.e., in TDM fashion), and (3) a third scenario in which PDSCH1 and PDSCH2 are scheduled on the same time and frequency resources but different MIMO layers (i.e., in SDM fashion).

CORESET Allocation

Figure 8:
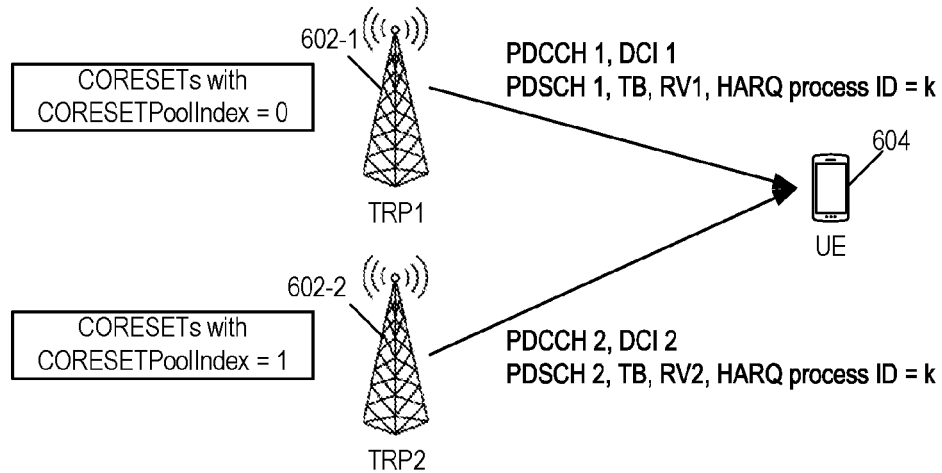
FIG. 8 illustrates an example of an embodiment in which a UE is scheduled with two PDSCHs via two Downlink Control Information (DCI) messages received from Control Resource Sets (CORESETs) in different CORESET pools.

In one embodiment, more than one CORESET pool may be configured, each associated with a different TRP. Each of the multiple DCIs may be sent using a CORESET in a different CORESET pool. FIG. 8 shows an example of this embodiment where the UE 604 is scheduled with two PDSCHs via two DCIs received from CORESETs in different CORESET pools. The two DCIs (DCI 1 and DCI 2) schedule the same TB and indicate the same HARQ process ID when scheduling the corresponding PDSCHs.

For each PDCCH monitoring occasion, when a DCI for a PDSCH is detected, a UE stops searching for another DCI for a second PDSCH in the same CORESET pool. This would save some UE processing if the DCI for scheduling PDSCH is detected early before all CORESETs in one CORESET pool are searched. But in case two CORESET pools are configured to the UE 604, the UE 604 would search for a second DCI scheduling a second PDSCH in the CORESETs belonging to the second CORESET pool.

In another embodiment, only one CORESET pool may be configured, and the multiple DCIs are sent from a same CORESET pool. In this case, a UE needs to search through all activated CORESETs for possibly another DCI for a second PDSCH.

HARQ ACK/NACK Feedback

In one embodiment, the PDSCHs are decoded individually without soft combining. The UE 604 may feedback a separate HARQ ACK/NACK for each PDSCH independently. The feedback may be in a same uplink slot or in different uplink slots. This may be done by configuring the "PDSCH-to-HARQ_feedback timing indicator" for the multiple DCIs such that the multiple HARQ ACK/NACKs are in a same slot or different slots. In addition, in case the HARQ ACK/NACKs are sent in different slots, the multiple HARQ ACK/NACKs may be sent toward different TRPs (e.g., TRP 602-1 and TRP 602-2) to provide HARQ ACK/NACK diversity. An example is shown in FIG. 9, where two PDSCHs are scheduled by two PDCCHs for a same TB and separate HARQ ACK/NACK feedback is provided for the two PDSCHs.

Figure 5:
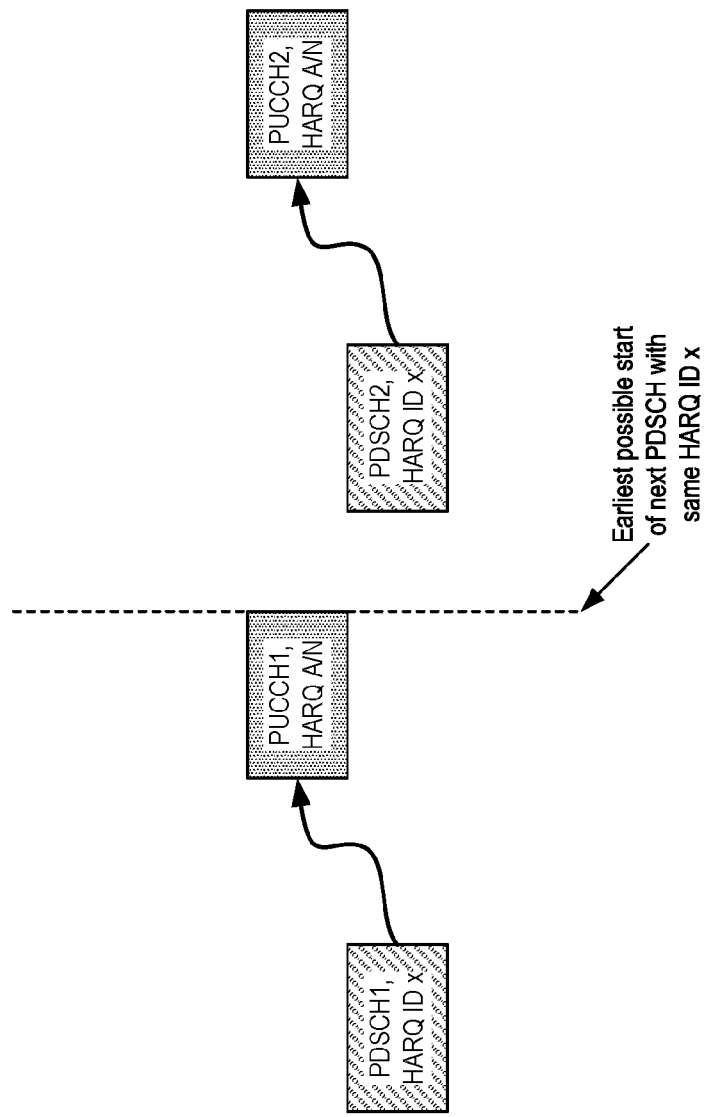
FIG. 5 illustrates a scheduling limitation in New Radio (NR) with regards to two Physical Downlink Shared Channels (PDSCHs) with the same Hybrid Automatic Repeat Request (HARQ) process where a User Equipment (UE) is not expected to receive another PDSCH for a given HARQ process until after the end of the expected transmission of HARQ-ACK for that HARQ process.
Figure 9:
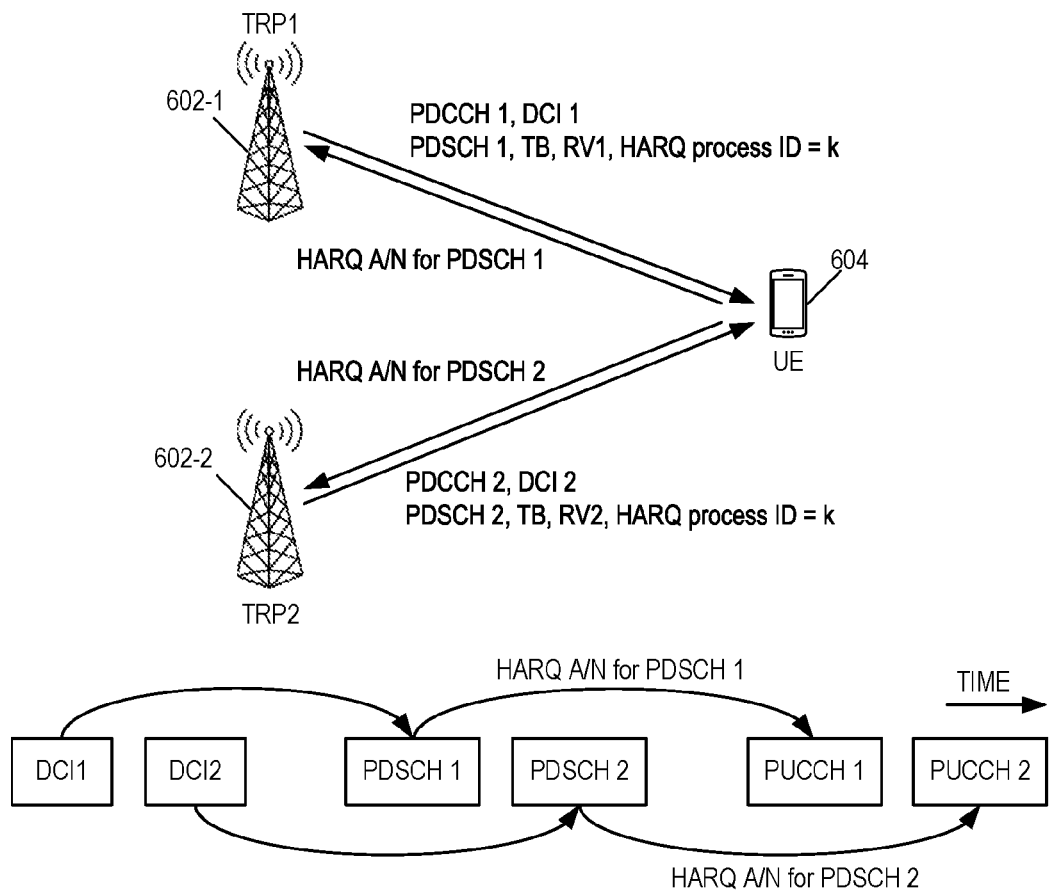
FIG. 9 illustrates an example of an embodiment in which two PDSCHs are scheduled by two PDCCHs for a same Transport Block (TB) and separate HARQ ACK/NACK feedback is provided for the two PDSCHs.

Note that the PDSCH scheduling in FIG. 9 relaxes the PDSCH scheduling limitation in FIG. 5. That is, PDSCH2 is allowed to be received before HARQ ACK/NACK is transmitted in PUCCH1. In some embodiments, this relaxation of the scheduling limitation in FIG. 5 is only allowed if the two DCIs (i.e., DCI1 and DCI2) scheduling the two PDSCHs are detected within different CORESET pools (i.e., as shown in FIG. 8). In other words, if the two DCIs scheduling the two PDSCHs are detected within the same CORESET pools, then the scheduling limitation in FIG. 5 still applies. Alternatively, a new rule may be defined such that the existing NR scheduling limitation shown in FIG. 5 does not hold if the PDSCHs contain the same information payload. In a further embodiment, a new parameter (e.g., a new RRC parameter) may be introduced to indicate that the multiple PDSCHs may be scheduled but with the same payload and the existing NR scheduling limitation scheduling limitation shown in FIG. 5 does not hold.

For Type 2 HARQ codebook (CB) (i.e., dynamic HARQ CB) based HARQ ACK/NACK feedback, in one embodiment, the DAI (Downlink Allocation Indicator) is incremented for each of the multiple DCIs for a same TB, if the corresponding PUCCH resource occurs in a same slot or subslot. Thus, multiple ACK/NACK bits are allocated for the multiple PDSCHs, one for each of the PDSCHs. If a missing DCI is detected through DAI, a NACK is sent for the corresponding missing PDSCH.

In a variant of this embodiment (referring to FIG. 9), if at least one of PDSCH1 or PDSCH2 is decoded correctly, then HARQ ACK is sent on both PUCCH1 and PUCCH2. The reason is as follows. Both PDSCH1 and PDSCH2 correspond to the same TB (i.e., with different RBs). Hence, it is sufficient to successfully decode at least one of the two PDSCHs. If at least one PDSCH is decoded successfully, then HARQ ACK can be sent on both PUCCHs which will give PUCCH diversity (particularly if PUCCH1 and PUCCH2 target different TRPs; that is, PUCCH1 and PUCCH2 are allocated with different spatial relations). If both PDSCHs are decoded erroneously, a HARQ NACK will be sent on both PUCCHs. In some cases, there is a minimum time gap required between the end of PDSCH2 and the first symbol of PUCCH1. This allows the UE 604 sufficient time for decoding both PDSCH1 and PDSCH2 before deciding whether a HARQ ACK or HARQ NACK needs to be transmitted in PUCCH1 and PUCCH2.

In a second variant of this embodiment (referring to FIG. 9), if the UE decodes PDSCH1 successfully (i.e., the UE decodes the earlier of the two PDSCHs successfully when the two PDSCHs are TDMed), then the UE does not need to decode PDSCH2. This can save the UE some processing in cases where PDSCH1 can be decoded successfully. The UE only needs to decode PDSCH2 when PDSCH1 is not decoded successfully.

In another embodiment, the multiple PDSCHs may be decoded jointly with soft combining. Whether the UE is allowed to do this is enabled by a high layer parameter, e.g., an RRC parameter. A UE may feedback a single HARQ ACK/NACK for the multiple PDSCHs. In this case, for type 2 HARQ codebook, a same DAI value may be used for each of multiple DCIs. Thus, a single ACK/NACK bit is allocated for the multiple PDSCHs. ACK is sent if the TB is decoded successfully. Otherwise, NACK is sent. The position of the ACK/NACK bit in an ACK/NACK bit sequence is determined by the position of the first detected DCI. An example is shown in FIG. 10.

Figure 10:
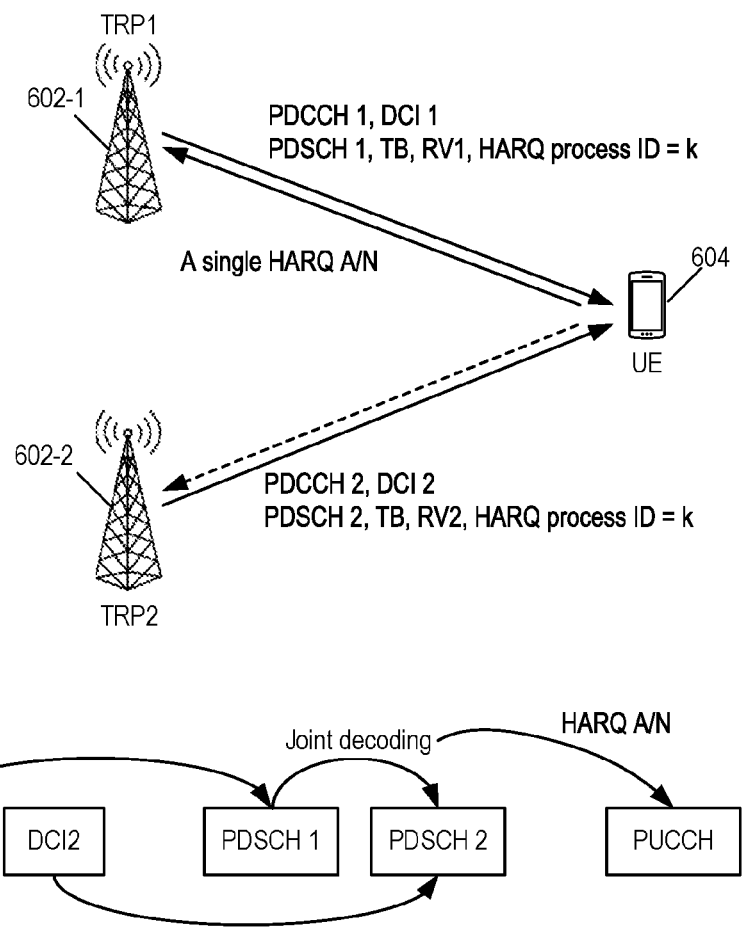
FIG. 10 illustrates an example of an embodiment in which multiple PDSCHs may be decoded jointly with soft combining and the position of the HARQ ACK/NACK bit in a HARQ ACK/NACK bit sequence is determined by the position of the first detected DCI.

In some cases, there is a minimum time gap required between the end of PDSCH2 and the first symbol of PUCCH in FIG. 10. This allows the UE sufficient time for joint decoding of PDSCH1 and PDSCH2 before deciding whether a HARQ ACK or HARQ NACK needs to be transmitted in PUCCH. In one variant of this embodiment, the PUCCH resource for transmitting the HARQ ACK/NACK is given by the PRI field and the PDSCH-to-HARQ_feedback timing indicator field indicated by the first DCI or the second DCI, and the PRI field/PDSCH-to-HARQ_feedback timing indicator field of the other DCI is ignored by the UE. In some other variants of this embodiment, the UE expects the PRI field/PDSCH-to-HARQ_feedback timing indicator field of the first and second DCIs to point to the same PUCCH resource.

Figure 11:
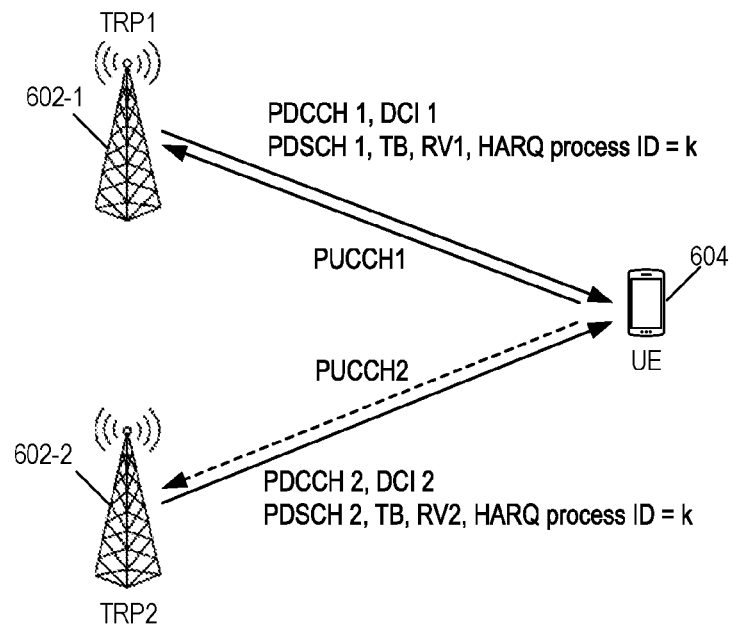
FIG. 11 illustrates a first example embodiment in which multiple PUCCH resources, each toward a different TRP, are allocated when multiple PDSCHs may be jointed decoded and the same HARQ ACK/NACK is sent in each of the multiple PUCCH resources to improve HARQ ACK/NACK reliability and a second example embodiment in which a first received PDSCH is decoded and the corresponding HARQ ACK/NACK is sent in a first PUCCH resource and, when a second PDSCH is received, it is decoded jointly with the first PDSCH with soft combining and the corresponding HARQ ACK/NACK is sent in a second PUCCH resource.
Figure 11:
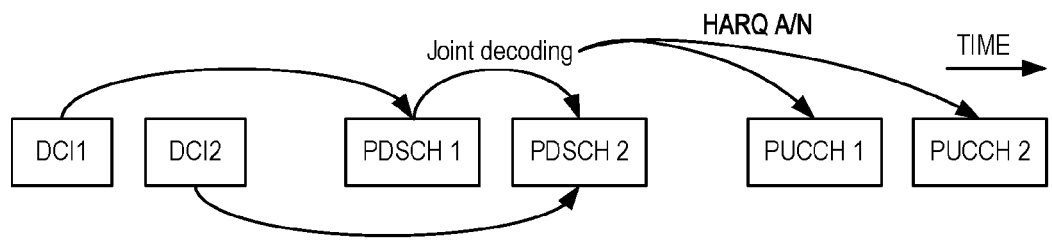
Figure 11:
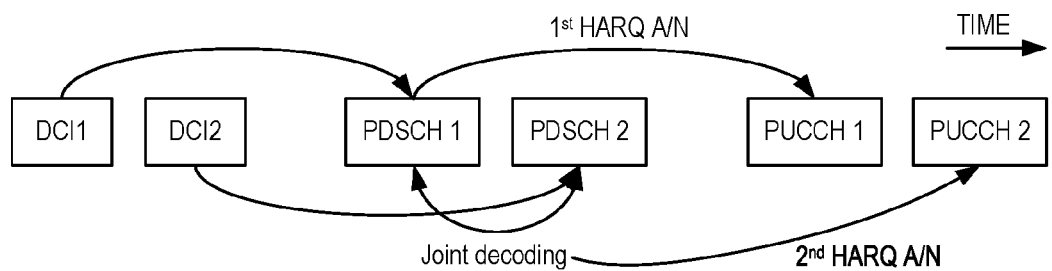

Alternatively, multiple PUCCH resources, each toward a different TRP (characterized by a spatial relation) are allocated when the multiple PDSCHs may be decoded jointly. The same HARQ ACK/NACK is sent in each of the multiple PUCCH resources to improve HARQ ACK/NACK reliability. An example is shown in FIG. 11(*a*). In yet another embodiment, a first received PDSCH is decoded and the corresponding HARQ ACK/NACK is sent in a first PUCCH resource. When a second PDSCH is received, it is decoded jointly with the first PDSCH with soft combining and the corresponding HARQ ACK/NACK is sent in a second PUCCH resource. An example is shown in FIG. 11(*b*).

In one embodiment, whether the UE 604 can transmit two PUCCH5 to support PUCCH diversity (according to embodiments related to FIG. 9) or if it can transmit a single PUCCH (according to embodiments related to FIG. 10) is reported as a UE capability. Upon receiving the UE capability, in some embodiments, the network (e.g., TRP 602-1 or TRP 602-2, which in this example is a gNB) configures the UE 604 with either a single PUCCH or two PUCCHs to support PUCCH diversity via a higher layer parameter (e.g., RRC parameter).

Further Discussion

Figure 12:
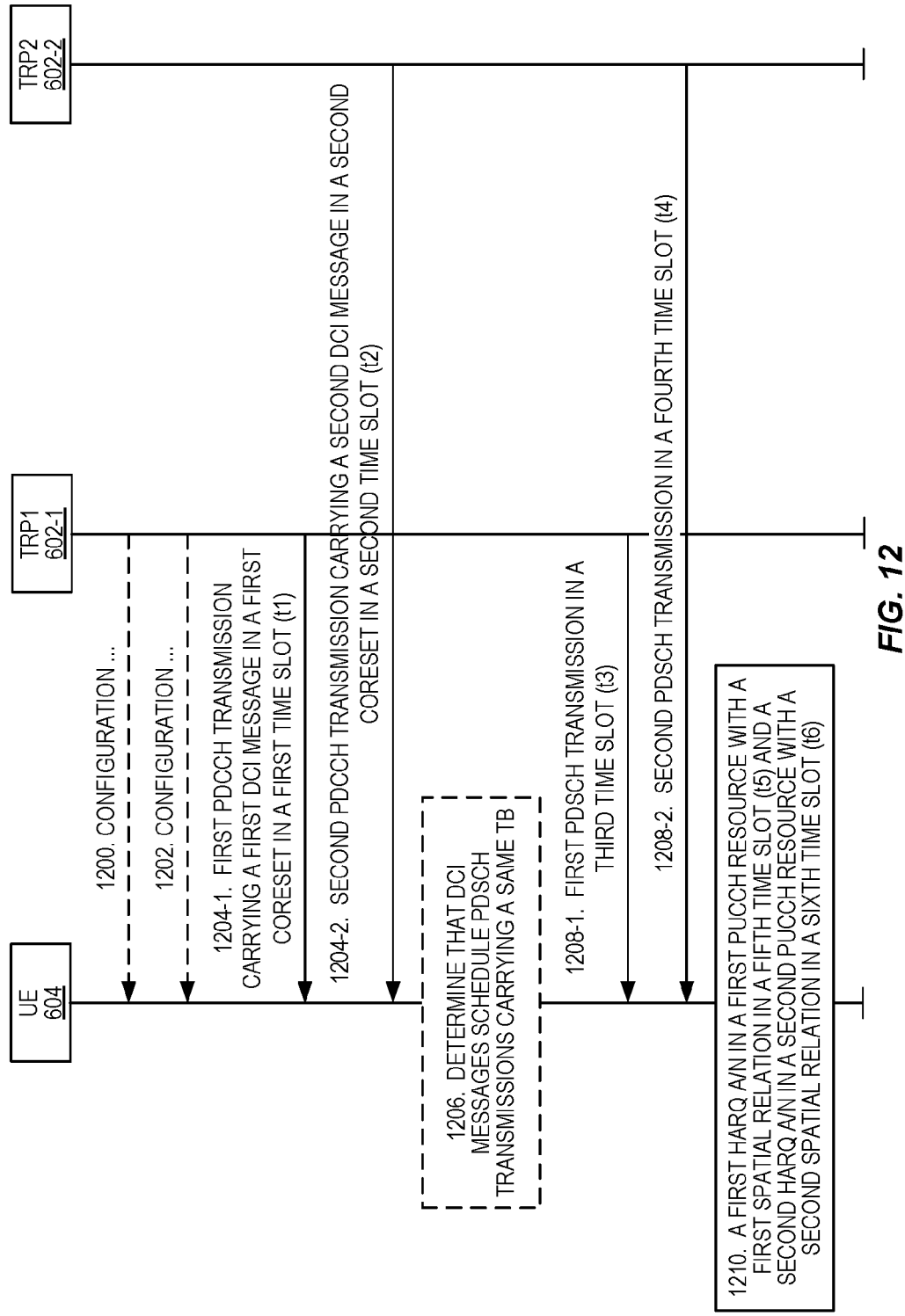
FIG. 12 illustrates the operation of a UE and two TRPs to provide multi-DCI scheduling in accordance with at least some of the embodiments described above.

FIG. 12 illustrates the operation of the UE 604 and two TRPs 602-1 and 602-2 to provide multi-DCI scheduling in accordance with at least some of the embodiments described above. Optional steps are represented by dashed lines/boxes. Further, note that while the DCIs and PDSCHs are transmitted by different TRPs in the illustrated example, the present disclosure is not limited thereto. As illustrated, the TRP 602-1, in this example, may provide configuration information to the UE 604 (steps 1200 and 1202). The TRPs 602-1 and 602-2 transmit, and the UE 604 receives, a first PDCCH transmission carrying a first DCI message in a first CORESET in a first time slot (t1) and a second PDCCH transmission carrying a second DCI message in a second CORESET in a second time slot (t2), wherein t1≤t2 (steps 1204-1 and 1204-2, which are generally referred to herein as step 1204). Note that while "time slots" are referred to herein, the embodiments are more generally applicable to "time periods", which may be, for example, a time slot or any other appropriate time period. The TRPs 602-1 and 602-2 transmit, and the UE 604 receives, a first PDSCH transmission scheduled by the first DCI message in a third time slot (t3) and a second PDSCH transmission scheduled by the second DCI message in a fourth time slot (t4), wherein the first and the second PDSCH transmissions are associated with a same HARQ process and a same TB, and t3≤t4 (steps 1208-1 and 1208-2, which are generally referred to herein as step 1208). The UE 604 sends, and at least one of the TRPs 602-1 and 602-2 receives, a first HARQ ACK/NACK in a first PUCCH resource with a first spatial relation in a fifth time slot (t5) and a second HARQ ACK/NACK in a second PUCCH resource with a second spatial relation in a sixth time slot (t6), wherein t5≤t6 and t4≤t5 (1210). Note that, as used herein, a "spatial relation" or "spatial relation configuration" for an UL channel is defined by a first reference signal (e.g., CSI-RS, SSB, or SRS) which the UL channel is related to in terms of transmit direction, and a second DL reference signal (e.g., CSI-RS or SSB) for pathloss measurement for transmit power control and other parameters related to power control.

In some embodiments, the first and the second CORESETs are configured (e.g., by RRC and activated by MAC CE) with a first and a second TCI state, respectively. Further, in one embodiment, the first and the second TCI states are different.

In some embodiments, a third TCI state is indicated in the first DCI message for the first PDSCH transmission and a fourth TCI state is indicated in the second DCI message for the second PDSCH transmission, and the third and the fourth TCI states are different.

In some embodiments, a same HARQ process identifier is indicated in the first and the second DCI messages, thereby associating the first and second PDSCH transmissions with the same HARQ process. Further, in one embodiment, a same NDI is comprised in the first and second DCI messages. Further, in one embodiment, the UE 604 further operates to determine (1206) that the first and second PDSCH transmissions carry the same TB, e.g., based on the first and second DCI messages both comprising the same HARQ process identifier and the same NDI.

In some embodiments, the first PUCCH resource is determined by at least a first PRI in the first DCI message and the second PUCCH resource by a second PRI in the second DCI message, respectively.

In some embodiments, the first and the second spatial relations for the first and second PUCCH resources are different.

In some embodiments, the network (e.g., TRP 602-1 or 602-2) sends, and the UE 604 receives, a configuration (e.g., an RRC and an MAC CE) of the first and the second configured spatial relations each comprising a reference signal (e.g., a NZP CSI-RS, a SSB, or a SRS) indicating a transmit direction and/or a spatial filter to use, a downlink reference signal (e.g., a NZP CSI-RS, or a SSB) for pathloss calculation, and power control parameters.

In some embodiments, the network (e.g., TRP 602-1 or 602-2) sends, and the UE 604 receives, an RRC configuration of a list of TCI states for PDSCH. In some embodiments, the network (e.g., TRP 602-1 or 602-2) sends, and the UE 604 receives, a TCI state activation MAC CE in activating a subset of TCI states including the first and the second TCI states from the list of TCI states.

In some embodiments, the first HARQ ACK/NACK is associated to the first PDSCH transmission and the second HARQ ACK/NACK is associated to the second PDSCH transmission.

In some embodiments, the second HARQ ACK/NACK is associated to both the first and the second PDSCH transmissions, wherein an ACK is send if one of the first and the second PDSCH transmissions is decoded successfully.

In some embodiments, the first and the second PUCCH resources are the same or different.

In some embodiments, the first PDSCH transmission and the second PDSCH transmission are decoded independently.

In some embodiments, the second PDSCH is decoded by combining the first PDSCH transmission and the second PDSCH transmission.

In some embodiments, the UE 604 receives (e.g., from the first TRP 102-1 in this example) a configuration (e.g., an RRC configuration) that indicates to the UE that the UE is to expect to receive two (or more) PDSCH transmissions scheduled by two (or more) DCI messages. This configuration may be, for example, in step 1200.

In some embodiments, the UE 604 receives (e.g., from the first TRP 102-1 in this example) a configuration (e.g., an RRC configuration) that indicates a first CORESET pool and a second CORESET pool, and the first and the second CORESETs belong to the first and the second CORESET pools, respectively. This configuration may be, for example, in step 1202.

In some embodiments, different modulation and coding schemes, MCSs, and/or different redundancy versions, RVs, and/or different time and frequency resource allocations, and/or different spatial layers are indicated for the first and second PDSCH transmissions in the first and the second DCI messages.

Figure 13:
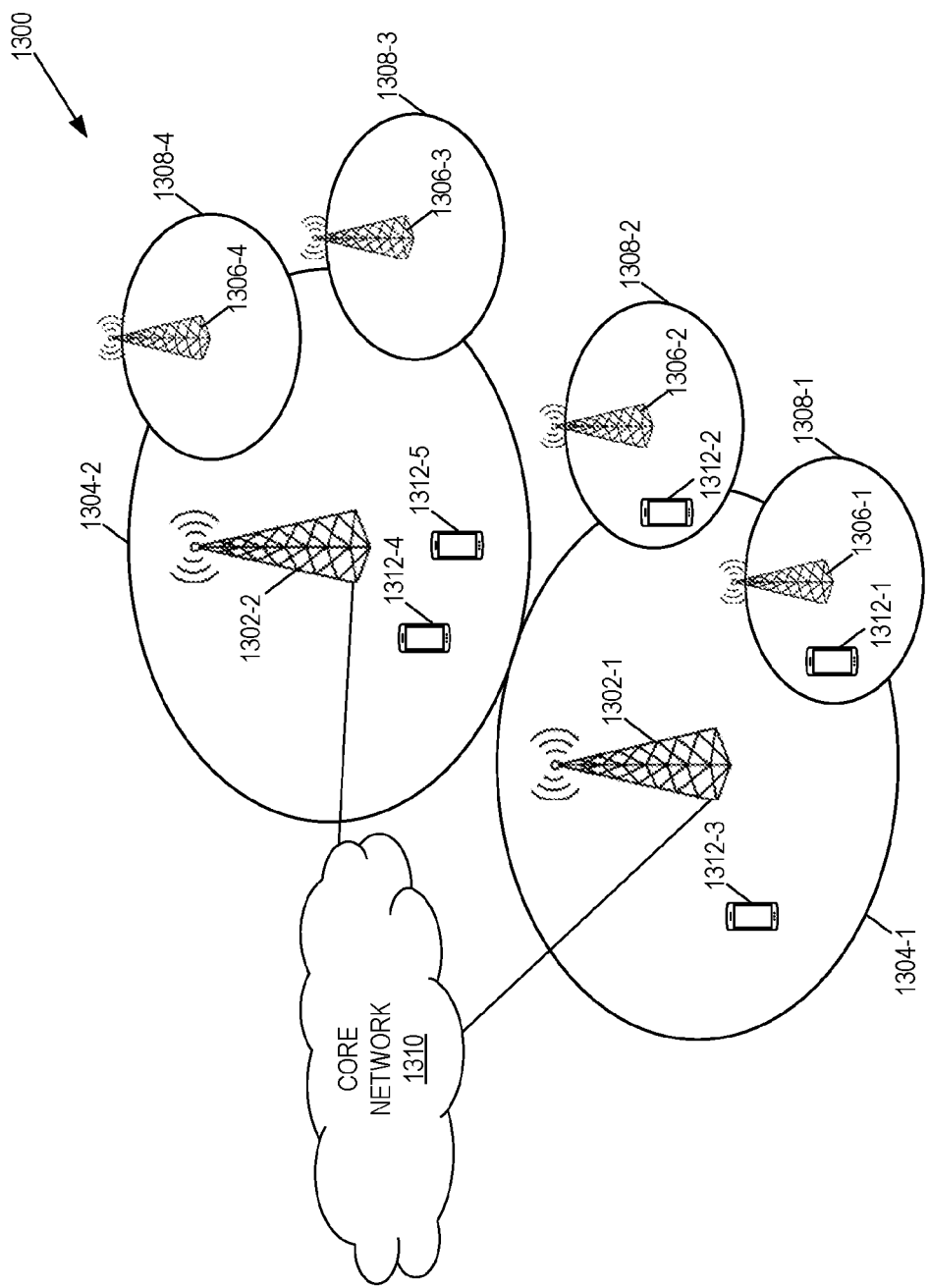
FIG. 13 illustrates one example of a cellular communications system 1300 in which embodiments of the present disclosure may be implemented.

FIG. 13 illustrates one example of a cellular communications system 1300 in which embodiments of the present disclosure may be implemented. In the embodiments described herein, the cellular communications system 1300 is a 5G System (5GS) including a Next Generation RAN that includes gNBs utilizing the NR Radio Access Technology (RAT) and, optionally, ng-eNBs utilizing the LTE RAT (i.e., LTE RAN nodes connected to the 5GC). In this example, the RAN includes base stations 1302-1 and 1302-2, which in 5G NR are referred to as gNBs, controlling corresponding (macro) cells 1304-1 and 1304-2. The base stations 1302-1 and 1302-2 are generally referred to herein collectively as base stations 1302 and individually as base station 1302. Likewise, the (macro) cells 1304-1 and 1304-2 are generally referred to herein collectively as (macro) cells 1304 and individually as (macro) cell 1304. The RAN may also include a number of low power nodes 1306-1 through 1306-4 controlling corresponding small cells 1308-1 through 1308-4. The low power nodes 1306-1 through 1306-4 can be small base stations (such as pico or femto base stations) or RRHs, or the like. Notably, while not illustrated, one or more of the small cells 1308-1 through 1308-4 may alternatively be provided by the base stations 1302. The low power nodes 1306-1 through 1306-4 are generally referred to herein collectively as low power nodes 1306 and individually as low power node 1306. Likewise, the small cells 1308-1 through 1308-4 are generally referred to herein collectively as small cells 1308 and individually as small cell 1308. The cellular communications system 1300 also includes a core network 1310, which in the 5GS is referred to as the 5G Core (5GC). The base stations 1302 (and optionally the low power nodes 1306) are connected to the core network 1310.

The base stations 1302 and the low power nodes 1306 provide service to wireless communication devices 1312-1 through 1312-5 in the corresponding cells 1304 and 1308. The wireless communication devices 1312-1 through 1312-5 are generally referred to herein collectively as wireless communication devices 1312 and individually as wireless communication device 1312. In the description provide herein, wireless communication devices 1312 are oftentimes UEs, but the present disclosure is not limited thereto. One example of a wireless communication device 1312 is the UE, e.g., the UE 604 described in relation to the embodiments described above.

Figure 14:
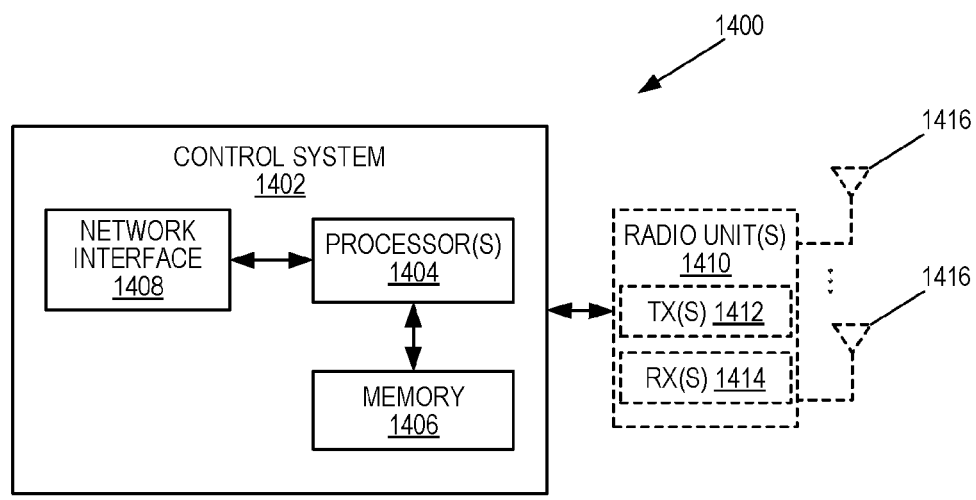
FIGS. 14 through 16 are schematic block diagrams of example embodiments of a radio access node.

FIG. 14 is a schematic block diagram of a radio access node 1400 according to some embodiments of the present disclosure. Optional features are represented by dashed boxes. The radio access node 1400 may be, a TRP, e.g., the TRP 602-1 or the TRP 602-2 of FIG. 12, that operates in accordance with any of the embodiments described above. The radio access node 1400 may be, for example, a base station 1302 or 1306 or a network node that implements all or part of the functionality of the base station 1302 or gNB described herein. As illustrated, the radio access node 1400 includes a control system 1402 that includes one or more processors 1404 (e.g., Central Processing Units (CPUs), Application Specific Integrated Circuits (ASICs), Field Programmable Gate Arrays (FPGAs), and/or the like), memory 1406, and a network interface 1408. The one or more processors 1404 are also referred to herein as processing circuitry. In addition, the radio access node 1400 may include one or more radio units 1410 that each includes one or more transmitters 1412 and one or more receivers 1414 coupled to one or more antennas 1416. The radio units 1410 may be referred to or be part of radio interface circuitry. In some embodiments, the radio unit(s) 1410 is external to the control system 1402 and connected to the control system 1402 via, e.g., a wired connection (e.g., an optical cable). However, in some other embodiments, the radio unit(s) 1410 and potentially the antenna(s) 1416 are integrated together with the control system 1402. The one or more processors 1404 operate to provide one or more functions of a radio access node 1400 as described herein (e.g., one or more functions of a TRP such as, e.g., the TRP 602-1 or the TRP 602-2 of FIG. 12 described above). In some embodiments, the function(s) are implemented in software that is stored, e.g., in the memory 1406 and executed by the one or more processors 1404.

Figure 15:
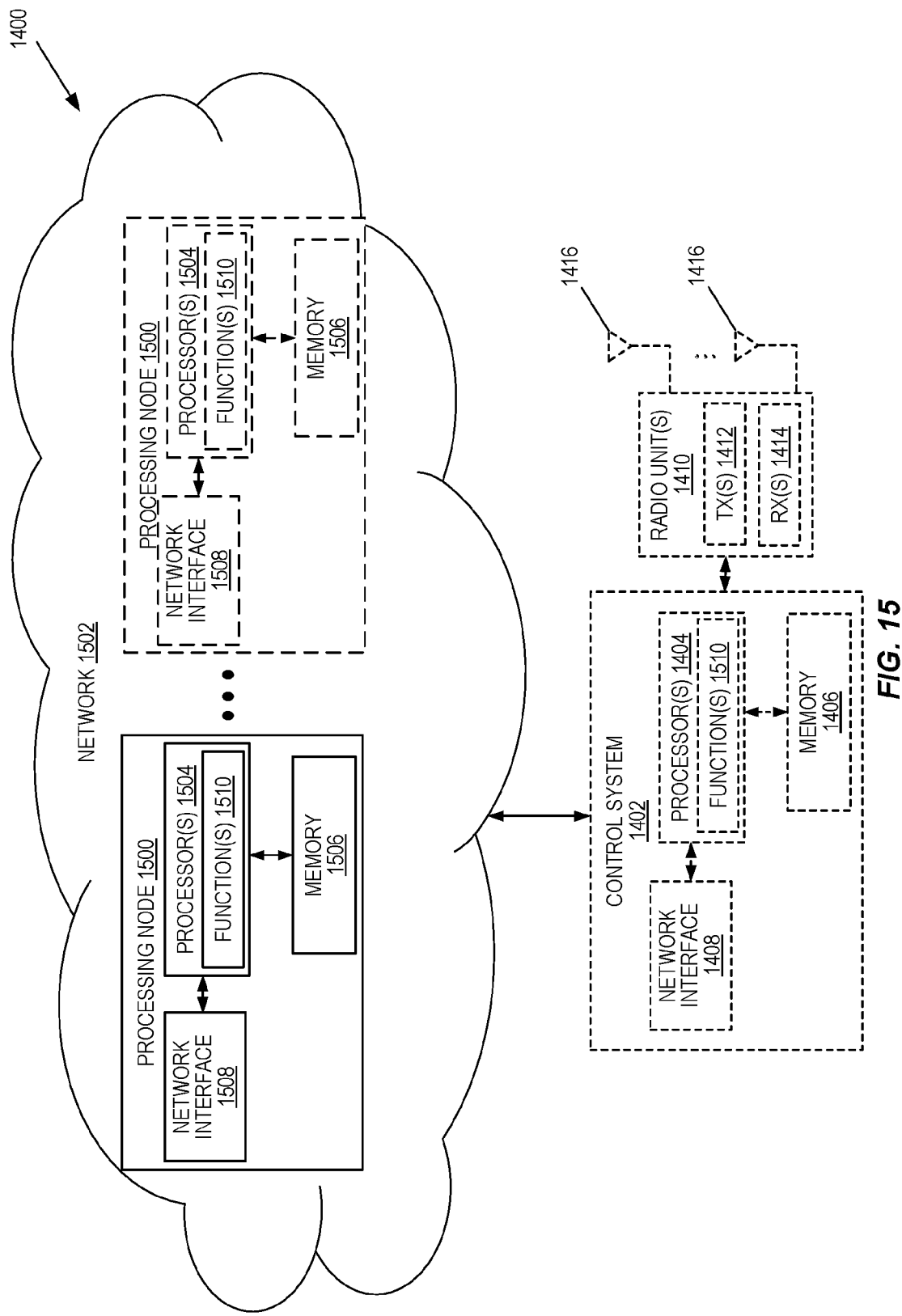

FIG. 15 is a schematic block diagram that illustrates a virtualized embodiment of the radio access node 1400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1400 in which at least a portion of the functionality of the radio access node 1400 is implemented as a virtual component(s) (e.g., via a virtual machine(s) executing on a physical processing node (s) in a network(s)). As illustrated, in this example, the radio access node 1400 may include the control system 1402 and/or the one or more radio units 1410, as described above. The control system 1402 may be connected to the radio unit(s) 1410 via, for example, an optical cable or the like. The radio access node 1400 includes one or more processing nodes 1500 coupled to or included as part of a network(s) 1502. If present, the control system 1402 or the radio unit(s) are connected to the processing node(s) 1500 via the network 1502. Each processing node 1500 includes one or more processors 1504 (e.g., CPUs, ASICs, FPGAs, and/or the like), memory 1506, and a network interface 1508.

In this example, functions 1510 of the radio access node 1400 described herein (e.g., one or more functions of a TRP such as, e.g., the TRP 602-1 or the TRP 602-2 of FIG. 12 described above) are implemented at the one or more processing nodes 1500 or distributed across the one or more processing nodes 1500 and the control system 1402 and/or the radio unit(s) 1410 in any desired manner. In some particular embodiments, some or all of the functions 1510 of the radio access node 1400 described herein are implemented as virtual components executed by one or more virtual machines implemented in a virtual environment(s) hosted by the processing node(s) 1500. As will be appreciated by one of ordinary skill in the art, additional signaling or communication between the processing node(s) 1500 and the control system 1402 is used in order to carry out at least some of the desired functions 1510. Notably, in some embodiments, the control system 1402 may not be included, in which case the radio unit(s) 1410 communicate directly with the processing node(s) 1500 via an appropriate network interface(s).

In some embodiments, a computer program including instructions which, when executed by at least one processor, causes the at least one processor to carry out the functionality of radio access node 1400 or a node (e.g., a processing node 1500) implementing one or more of the functions 1510 of the radio access node 1400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
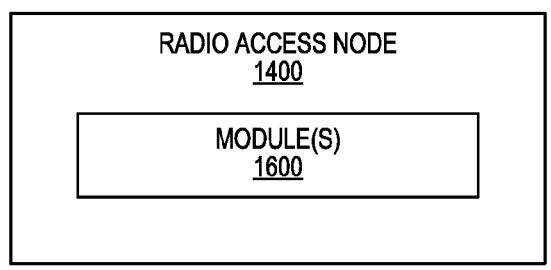

FIG. 16 is a schematic block diagram of the radio access node 1400 according to some other embodiments of the present disclosure. The radio access node 1400 includes one or more modules 1600, each of which is implemented in software. The module(s) 1600 provide the functionality of the radio access node 1400 described herein (e.g., one or more functions of a TRP such as, e.g., the TRP 602-1 or the TRP 602-2 of FIG. 12 described above). This discussion is equally applicable to the processing node 1500 of FIG. 15 where the modules 1600 may be implemented at one of the processing nodes 1500 or distributed across multiple processing nodes 1500 and/or distributed across the processing node(s) 1500 and the control system 1402.

Figure 17:
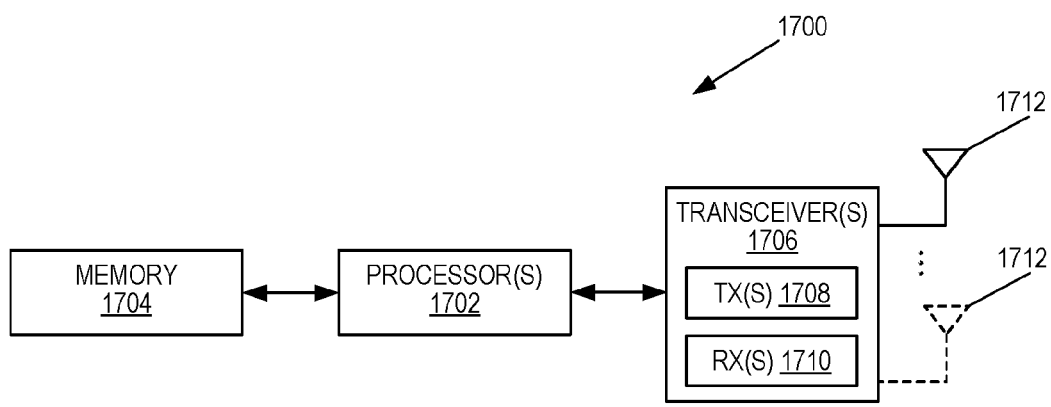
FIGS. 17 and 18 are schematic block diagrams of example embodiments of a wireless communication device (e.g., a UE)

FIG. 17 is a schematic block diagram of a wireless communication device 1700 according to some embodiments of the present disclosure. The wireless communication device 1700 may be, for example, a UE such as, e.g., the UE 604 of FIG. 12. As illustrated, the wireless communication device 1700 includes one or more processors 1702 (e.g., CPUs, ASICs, FPGAs, and/or the like), memory 1704, and one or more transceivers 1706 each including one or more transmitters 1708 and one or more receivers 1710 coupled to one or more antennas 1712. The transceiver(s) 1706 includes radio-front end circuitry connected to the antenna(s) 1712 that is configured to condition signals communicated between the antenna(s) 1712 and the processor(s) 1702, as will be appreciated by on of ordinary skill in the art. The processors 1702 are also referred to herein as processing circuitry. The transceivers 1706 are also referred to herein as radio circuitry. In some embodiments, the functionality of the wireless communication device 1700 described above (e.g., one or more functions of a UE such as, e.g., the UE 604 of FIG. 12, described above) may be fully or partially implemented in software that is, e.g., stored in the memory 1704 and executed by the processor(s) 1702. Note that the wireless communication device 1700 may include additional components not illustrated in FIG. 17 such as, e.g., one or more user interface components (e.g., an input/output interface including a display, buttons, a touch screen, a microphone, a speaker(s), and/or the like and/or any other components for allowing input of information into the wireless communication device 1700 and/or allowing output of information from the wireless communication device 1700), a power supply (e.g., a battery and associated power circuitry), etc.

In some embodiments, a computer program including instructions which, when executed by at least one processor, causes the at least one processor to carry out the functionality of the wireless communication device 1700 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 18:
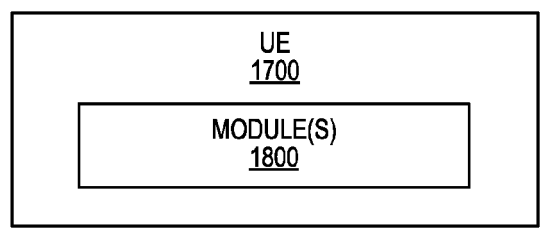

FIG. 18 is a schematic block diagram of the wireless communication device 1700 according to some other embodiments of the present disclosure. The wireless communication device 1700 includes one or more modules 1800, each of which is implemented in software. The module(s) 1800 provide the functionality of the wireless communication device 1700 described herein (e.g., one or more functions of a UE such as, e.g., the UE 604 of FIG. 12, described above).

Figure 19:
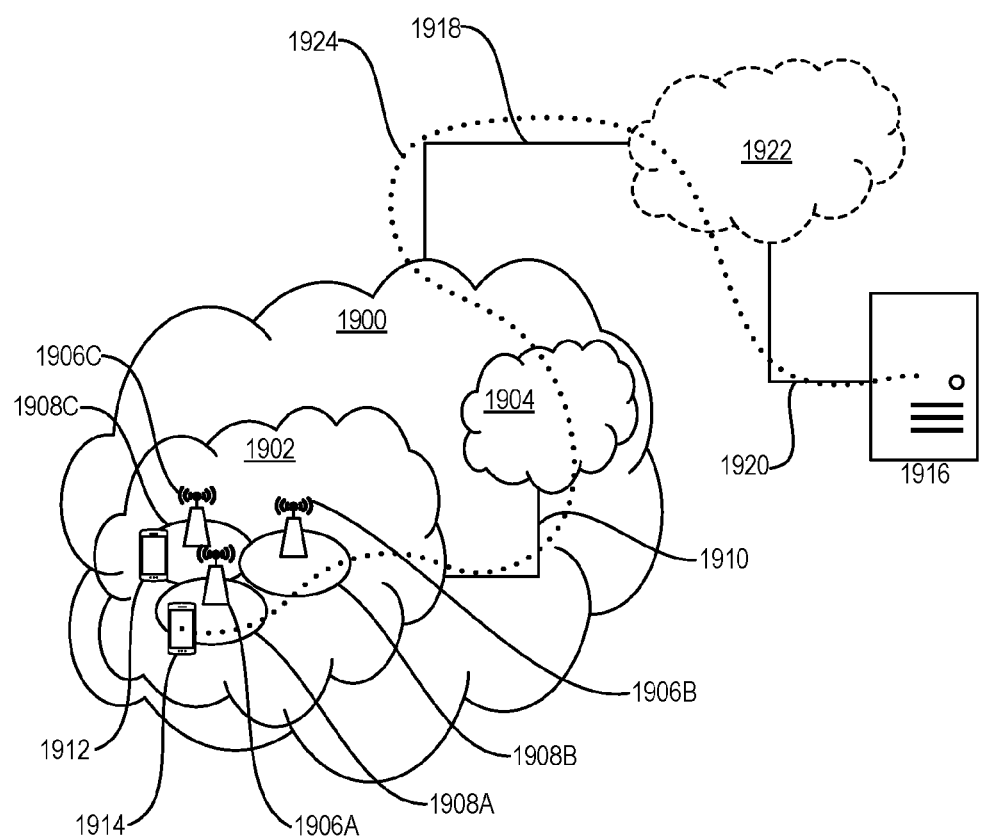
FIG. 19 illustrates an example embodiment of a communication system in which embodiments of the present disclosure may be implemented.

With reference to FIG. 19, in accordance with an embodiment, a communication system includes a telecommunication network 1900, such as a 3GPP-type cellular network, which comprises an access network 1902, such as a RAN, and a core network 1904. The access network 1902 comprises a plurality of base stations 1906A, 1906B, 1906C, such as Node Bs, eNBs, gNBs, or other types of wireless Access Points (APs), each defining a corresponding coverage area 1908A, 1908B, 1908C. Each base station 1906A, 1906B, 1906C is connectable to the core network 1904 over a wired or wireless connection 1910. A first UE 1912 located in coverage area 1908C is configured to wirelessly connect to, or be paged by, the corresponding base station 1906C. A second UE 1914 in coverage area 1908A is wirelessly connectable to the corresponding base station 1906A. While a plurality of UEs 1912, 1914 are illustrated in this example, the disclosed embodiments are equally applicable to a situation where a sole UE is in the coverage area or where a sole UE is connecting to the corresponding base station 1906.

The telecommunication network 1900 is itself connected to a host computer 1916, which may be embodied in the hardware and/or software of a standalone server, a cloudimplemented server, a distributed server, or as processing resources in a server farm. The host computer 1916 may be under the ownership or control of a service provider, or may be operated by the service provider or on behalf of the service provider. Connections 1918 and 1920 between the telecommunication network 1900 and the host computer 1916 may extend directly from the core network 1904 to the host computer 1916 or may go via an optional intermediate network 1922. The intermediate network 1922 may be one of, or a combination of more than one of, a public, private, or hosted network; the intermediate network 1922, if any, may be a backbone network or the Internet; in particular, the intermediate network 1922 may comprise two or more sub-networks (not shown).

The communication system of FIG. 19 as a whole enables connectivity between the connected UEs 1912, 1914 and the host computer 1916. The connectivity may be described as an Over-the-Top (OTT) connection 1924. The host computer 1916 and the connected UEs 1912, 1914 are configured to communicate data and/or signaling via the OTT connection 1924, using the access network 1902, the core network 1904, any intermediate network 1922, and possible further infrastructure (not shown) as intermediaries. The OTT connection 1924 may be transparent in the sense that the participating communication devices through which the OTT connection 1924 passes are unaware of routing of uplink and downlink communications. For example, the base station 1906 may not or need not be informed about the past routing of an incoming downlink communication with data originating from the host computer 1916 to be forwarded (e.g., handed over) to a connected UE 1912. Similarly, the base station 1906 need not be aware of the future routing of an outgoing uplink communication originating from the UE 1912 towards the host computer 1916.

Example implementations, in accordance with an embodiment, of the UE, base station, and host computer discussed in the preceding paragraphs will now be described with reference to FIG. 20. In a communication system 2000, a host computer 2002 comprises hardware 2004 including a communication interface 2006 configured to set up and maintain a wired or wireless connection with an interface of a different communication device of the communication system 2000. The host computer 2002 further comprises processing circuitry 2008, which may have storage and/or processing capabilities. In particular, the processing circuitry 2008 may comprise one or more programmable processors, ASICs, FPGAs, or combinations of these (not shown) adapted to execute instructions. The host computer 2002 further comprises software 2010, which is stored in or accessible by the host computer 2002 and executable by the processing circuitry 2008. The software 2010 includes a host application 2012. The host application 2012 may be operable to provide a service to a remote user, such as a UE 2014 connecting via an OTT connection 2016 terminating at the UE 2014 and the host computer 2002. In providing the service to the remote user, the host application 2012 may provide user data which is transmitted using the OTT connection 2016.

The communication system 2000 further includes a base station 2018 provided in a telecommunication system and comprising hardware 2020 enabling it to communicate with the host computer 2002 and with the UE 2014. The hardware 2020 may include a communication interface 2022 for setting up and maintaining a wired or wireless connection with an interface of a different communication device of the communication system 2000, as well as a radio interface 2024 for setting up and maintaining at least a wireless connection 2026 with the UE 2014 located in a coverage area (not shown in FIG. 20) served by the base station 2018. The communication interface 2022 may be configured to facilitate a connection 2028 to the host computer 2002. The connection 2028 may be direct or it may pass through a core network (not shown in FIG. 20) of the telecommunication system and/or through one or more intermediate networks outside the telecommunication system. In the embodiment shown, the hardware 2020 of the base station 2018 further includes processing circuitry 2030, which may comprise one or more programmable processors, ASICs, FPGAs, or combinations of these (not shown) adapted to execute instructions. The base station 2018 further has software 2032 stored internally or accessible via an external connection.

The communication system 2000 further includes the UE 2014 already referred to. The UE's 2014 hardware 2034 may include a radio interface 2036 configured to set up and maintain a wireless connection 2026 with a base station serving a coverage area in which the UE 2014 is currently located. The hardware 2034 of the UE 2014 further includes processing circuitry 2038, which may comprise one or more programmable processors, ASICs, FPGAs, or combinations of these (not shown) adapted to execute instructions. The UE 2014 further comprises software 2040, which is stored in or accessible by the UE 2014 and executable by the processing circuitry 2038. The software 2040 includes a client application 2042. The client application 2042 may be operable to provide a service to a human or non-human user via the UE 2014, with the support of the host computer 2002. In the host computer 2002, the executing host application 2012 may communicate with the executing client application 2042 via the OTT connection 2016 terminating at the UE 2014 and the host computer 2002. In providing the service to the user, the client application 2042 may receive request data from the host application 2012 and provide user data in response to the request data. The OTT connection 2016 may transfer both the request data and the user data. The client application 2042 may interact with the user to generate the user data that it provides.

Figure 20:
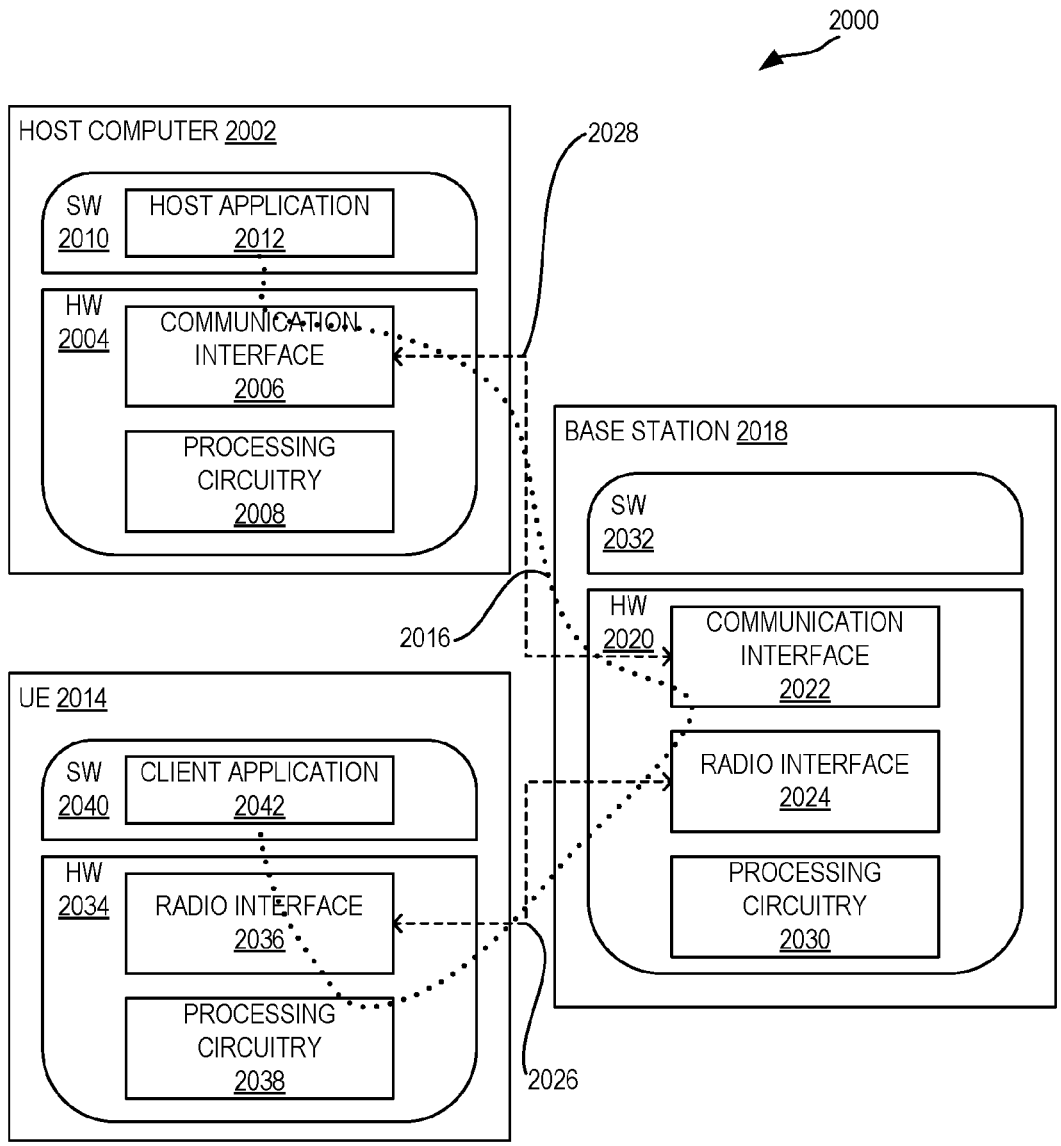
FIG. 20 illustrates example embodiments of the host computer, base station, and UE of FIG. 19.

It is noted that the host computer 2002, the base station 2018, and the UE 2014 illustrated in FIG. 20 may be similar or identical to the host computer 1916, one of the base stations 1906A, 1906B, 1906C, and one of the UEs 1912, 1914 of FIG. 19, respectively. This is to say, the inner workings of these entities may be as shown in FIG. 20 and independently, the surrounding network topology may be that of FIG. 19.

In FIG. 20, the OTT connection 2016 has been drawn abstractly to illustrate the communication between the host computer 2002 and the UE 2014 via the base station 2018 without explicit reference to any intermediary devices and the precise routing of messages via these devices. The network infrastructure may determine the routing, which may be configured to hide from the UE 2014 or from the service provider operating the host computer 2002, or both. While the OTT connection 2016 is active, the network infrastructure may further take decisions by which it dynamically changes the routing (e.g., on the basis of load balancing consideration or reconfiguration of the network).

The wireless connection 2026 between the UE 2014 and the base station 2018 is in accordance with the teachings of the embodiments described throughout this disclosure. One or more of the various embodiments improve the performance of OTT services provided to the UE 2014 using the OTT connection 2016, in which the wireless connection 2026 forms the last segment. More precisely, the teachings of these embodiments may improve reliability and thereby provide benefits such as better user experience.

A measurement procedure may be provided for the purpose of monitoring data rate, latency, and other factors on which the one or more embodiments improve. There may further be an optional network functionality for reconfiguring the OTT connection 2016 between the host computer 2002 and the UE 2014, in response to variations in the measurement results. The measurement procedure and/or the network functionality for reconfiguring the OTT connection 2016 may be implemented in the software 2010 and the hardware 2004 of the host computer 2002 or in the software 2040 and the hardware 2034 of the UE 2014, or both. In some embodiments, sensors (not shown) may be deployed in or in association with communication devices through which the OTT connection 2016 passes; the sensors may participate in the measurement procedure by supplying values of the monitored quantities exemplified above, or supplying values of other physical quantities from which the software 2010, 2040 may compute or estimate the monitored quantities. The reconfiguring of the OTT connection 2016 may include message format, retransmission settings, preferred routing, etc.; the reconfiguring need not affect the base station 2018, and it may be unknown or imperceptible to the base station 2018. Such procedures and functionalities may be known and practiced in the art. In certain embodiments, measurements may involve proprietary UE signaling facilitating the host computer 2002's measurements of throughput, propagation times, latency, and the like. The measurements may be implemented in that the software 2010 and 2040 causes messages to be transmitted, in particular empty or 'dummy' messages, using the OTT connection 2016 while it monitors propagation times, errors, etc.

Figures 21, 22:
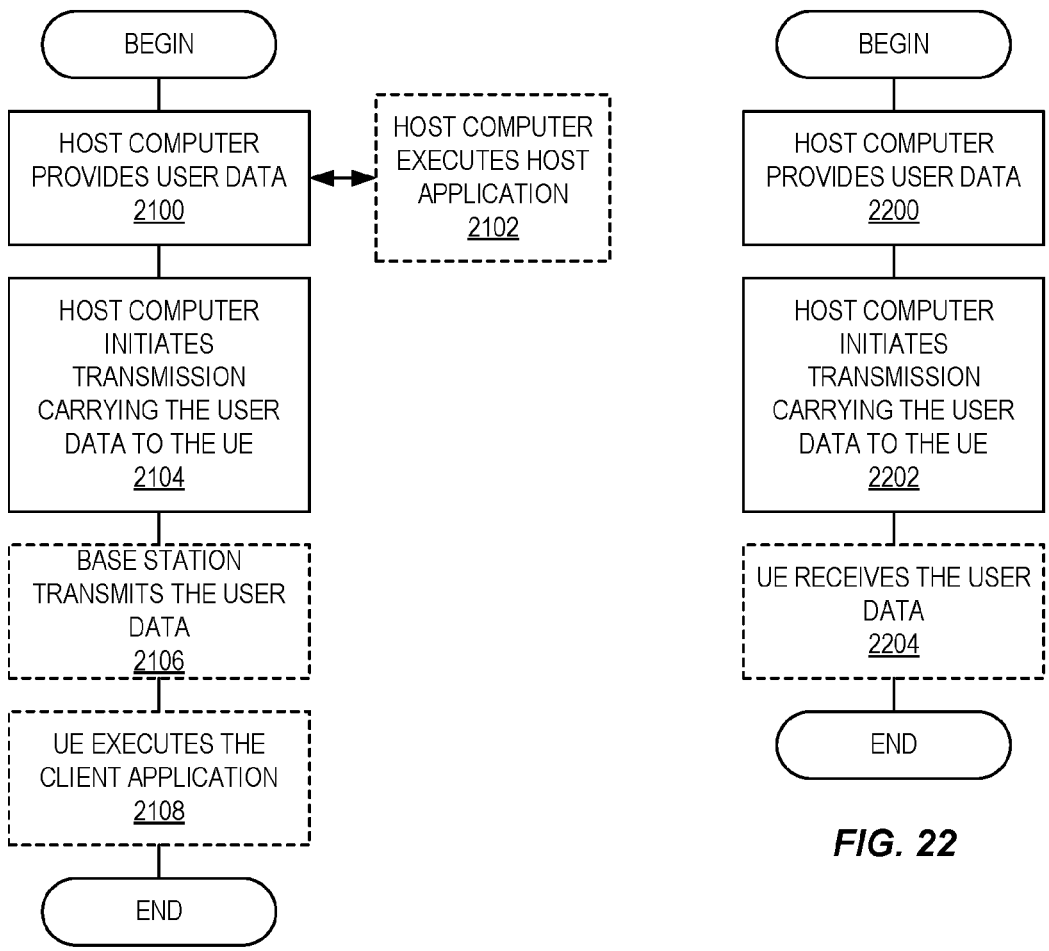
FIGS. 21 and 22 are flow charts that illustrate example embodiments of methods implemented in a communication system such as that of FIG. 19.

FIG. 21 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 21 will be included in this section. In step 2100, the host computer provides user data. In sub-step 2102 (which may be optional) of step 2100, the host computer provides the user data by executing a host application. In step 2104, the host computer initiates a transmission carrying the user data to the UE. In step 2106 (which may be optional), the base station transmits to the UE the user data which was carried in the transmission that the host computer initiated, in accordance with the teachings of the embodiments described throughout this disclosure. In step 2108 (which may also be optional), the UE executes a client application associated with the host application executed by the host computer.

FIG. 22 is a flowchart illustrating a method implemented in a communication system, in accordance with one embodiment. The communication system includes a host computer, a base station, and a UE which may be those described with reference to FIGS. 19 and 20. For simplicity of the present disclosure, only drawing references to FIG. 22 will be included in this section. In step 2200 of the method, the host computer provides user data. In an optional sub-step (not shown) the host computer provides the user data by executing a host application. In step 2202, the host computer initiates a transmission carrying the user data to the UE. The transmission may pass via the base station, in accordance with the teachings of the embodiments described throughout this disclosure. In step 2204 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a User Equipment, UE, (604) (e.g., for reliable data transmission with multiple Downlink Control Information, DCI, messages scheduling one or more Physical Downlink Shared Channel, PDSCH, transmissions for a same Transport Block, TB in a wireless network (e.g., a cellular communications system) comprising one or more network nodes (e.g., one or more TRPs) and one or more UEs including the UE (604)), the method comprising:

receiving (1204) a first PDCCH carrying a first DCI message in a first Control Resource Set, CORESET, in a first time period (e.g., a first time slot), t1, and a second PDCCH carrying a second DCI message in a second CORESET in a second time period (e.g., a second time slot), t2, wherein receiving (1208) a first PDSCH scheduled by the first DCI message in a third time period (e.g., a third time slot), t3, and a second PDSCH scheduled by the second DCI message in a fourth time period (e.g., a fourth time slot), t4, wherein the first and the second PDSCH are associated with a same HARQ process and a same TB, and t3≤t4;

sending (1210) a first Hybrid Automatic Repeat Request, HARQ, ACK/NACK in a first Physical Uplink Control Channel, PUCCH, resource according to a first configured (e.g., by RRC and activated by a MAC CE) PUCCH spatial relation in a fifth time period (e.g., a fifth time slot), t5, and a second HARQ ACK/NACK in a second PUCCH resource according to a second configured (e.g., by RRC and activated by a MAC CE) PUCCH spatial relation in a sixth time period (e.g., a sixth time slot), t6, wherein t5≤t6 and t4≤t5.

Embodiment 2: The method of embodiment 1, wherein the first and the second CORESET are configured (e.g., by RRC and activated by a MAC CE) with a first and a second configuration indicator, TCI, states, respectively.

Embodiment 3: The method of embodiment 2, wherein the first and the second TCI states are different.

Embodiment 4: The method of any one of embodiments 1 to 3, wherein a third TCI state is indicated in the first DCI message for the first PDSCH and a fourth TCI state is indicated in the second DCI message for the second PDSCH, and the third and the fourth TCI states are different.

Embodiment 5: The method of any one of embodiments 1 to 4, wherein a same HARQ process identifier is indicated in the first and the second DCI messages, thereby associating the first and second PDSCH with the same HARQ process.

Embodiment 6: The method of embodiment 5 wherein a same New Data Indicator, NDI, is comprised in the first and second DCI messages.

Embodiment 7: The method of embodiment 6 further comprising determining (1206) that the first and second PDSCH carry the same TB.

Embodiment 8: The method of any one of embodiments 1 to 7, wherein the first PUCCH resource is determined by at least a first PUCCH resource indicator, PRI, in the first DCI message and the second PUCCH resource by a second PRI in the second DCI message, respectively.

Embodiment 9: The method of any one of embodiments 1 to 8, wherein the first and the second configured spatial relations are different.

Embodiment 9a: The method of any one of embodiments 1 to 9, wherein the method further comprising receiving a configuration (e.g., an RRC and an MAC CE) of the first and the second configured spatial relations each comprising a reference signal (e.g., a NZP CSI-RS, a SSB, or a SRS) indicating a transmit direction and/or a spatial filter to use, a downlink reference signal (e.g., a NZP CSI-RS, or a SSB) for pathloss calculation, and power control parameters.

Embodiment 9b: The method of any one of embodiments 1 to 9, wherein the method further comprising receiving an RRC configuration of a list of TCI states for PDSCH.

Embodiment 9c: The method of any one of embodiments 1 to 9b, wherein the method further comprising receiving a TCI state activation MAC CE in activating a subset of TCI states including the first and the second TCI states from the list of TCI states.

Embodiment 10: The method of any one of embodiments 1 to 9c, wherein the first HARQ ACK/NACK is associated to the first PDSCH and the second HARQ ACK/NACK is associated to the second PDSCH.

Embodiment 11: The method of any one of embodiments 1 to 9c, wherein the second HARQ ACK/NACK is associated to both the first and the second PDSCH, wherein an ACK is sent if one of the first and the second PDSCH is decoded successfully.

Embodiment 12: The method of any one of embodiments 1 to 11, wherein the first and the second PUCCH resources are the same or different.

Embodiment 13: The method of any one of embodiments 1 to 12, wherein the first PDSCH and the second PDSCH are decoded independently.

Embodiment 14: The method of any one of embodiments 1 to 12, wherein the second PDSCH is decoded by combining the first PDSCH and the second PDSCH.

Embodiment 15: The method of any one of embodiments 1 to 14, further comprising receiving (1200) a configuration (e.g., an RRC configuration) that indicates to the UE that the UE is to expect to receive two (or more) PDSCHs scheduled by two (or more) DCI messages.

Embodiment 16: The method of any one of embodiments 1 to 15, wherein the method further comprising receiving (1202) a configuration (e.g., an RRC configuration) that indicates a first CORESET pool and a second CORESET pool, and the first and the second CORESETs belong to the first and the second CORESET pools, respectively.

Embodiment 17: The method of any one of embodiments 1 to 16, wherein the same or different modulation and coding schemes, MCSs, and/or different redundancy versions, RVs, and/or different time and frequency resource allocations, and/or different spatial layers are indicated in the first and the second DCI messages.

Embodiment 18: The method of any of the previous embodiments, further comprising: providing user data; and forwarding the user data to a host computer via the transmission to the base station.

Group B Embodiments

Embodiment 19: A method performed by one or more transmission points, TRPs, (602-1; 602-2), the method comprising:
transmitting (1204), to a User Equipment, UE, (604), a first PDCCH carrying a first DCI message in a first Control Resource Set, CORESET, in a first time period, t1, and a second PDCCH carrying a second DCI message in a second CORESET in a second time period, t2, wherein t1≤t2;
transmitting (1208), to the UE (604), a first PDSCH scheduled by the first DCI message in a third time period, t3, and a second PDSCH scheduled by the second DCI message in a fourth time period, t4, wherein the first and the second PDSCH are associated with a same HARQ process and a same TB, and t3≤t4; and
receiving (1210), from the UE (604), a first Hybrid Automatic Repeat Request, HARQ, ACK/NACK in a first Physical Uplink Control Channel, PUCCH, resource with a first configured (e.g., by RRC and activated by a MAC CE) spatial relation in a fifth time period, t5, and a second HARQ ACK/NACK in a second PUCCH resource with a second configured (e.g., by RRC and activated by a MAC CE) spatial relation in a sixth time period, t6, wherein t5≤t6 and t4≤t5.

Embodiment 20: The method of embodiment 19, wherein the first and the second CORESET are configured (e.g., by RRC and activated by a MAC CE) with a first and a second transmission configuration indicator, TCI, states, respectively.

Embodiment 21: The method of embodiment 20, wherein the first and the second TCI states are different.

Embodiment 22: The method of any one of embodiments 19 to 21, wherein a third TCI state is indicated in the first DCI message for the first PDSCH and a fourth TCI state is indicated in the second DCI message for the second PDSCH, and the third and the fourth TCI states are different.

Embodiment 23: The method of any one of embodiments 19 to 22, wherein a same HARQ process identifier is indicated in the first and the second DCI messages, thereby associating the first and second PDSCH with the same HARQ process.

Embodiment 24: The method of embodiment 23 wherein a same New Data Indicator, NDI, is comprised in the first and second DCI messages.

Embodiment 25: The method of any one of embodiments 19 to 24, wherein the first PUCCH resource is indicated by at least a first PUCCH resource indicator, PRI, in the first DCI message and the second PUCCH resource by a second PRI in the second DCI message, respectively.

Embodiment 26: The method of any one of embodiments 19 to 25, wherein the first and the second spatial relations are different.

Embodiment 26a: The method of any one of embodiments 19 to 26, wherein the method further comprising sending an TCI activation MAC CE in activating the first and the second spatial relation each containing a reference signal (e.g., a NZP CSI-RS, a SSB, or a SRS) for indicating a transmit direction and/or a spatial filter to use, a downlink reference signal (e.g., a NZP CSI-RS, or a SSB) for pathloss calculation, and power control parameters.

Embodiment 27: The method of any one of embodiments 19 to 26a, wherein the first HARQ ACK/NACK is associated to the first PDSCH and the second HARQ ACK/NACK is associated to the second PDSCH.

Embodiment 28: The method of any one of embodiments 19 to 26a, wherein the second HARQ ACK/NACK is associated to both the first and the second PDSCH, wherein an ACK is received if one of the first and the second PDSCH is decoded successfully.

Embodiment 29: The method of any one of embodiments 19 to 28, wherein the first and the second PUCCH resources are the same or different.

Embodiment 30: The method of any one of embodiments 19 to 29, wherein the first PDSCH and the second PDSCH are assumed to be decoded independently at the UE.

Embodiment 31: The method of any one of embodiments 19 to 29, wherein the second PDSCH is assumed to be decoded by combining the first PDSCH and the second PDSCH at the UE.

Embodiment 32: The method of any one of embodiments 19 to 31, further comprising sending (1200), to the UE (604), a configuration (e.g., an RRC configuration) that indicates to the UE that the UE is to expect to receive two (or more) PDSCHs scheduled by two (or more) DCI messages.

Embodiment 33: The method of any one of embodiments 19 to 32, wherein the method further comprising sending (1202), to the UE (604), a configuration (e.g., an RRC configuration and a MAC CE) that indicates a first CORESET pool and a second CORESET pool, and the first and the second CORESETs belong to the first and the second CORESET pools, respectively.

Embodiment 33a: The method of any one of embodiments 19 to 33, further comprising sending (1200), to the UE (604), a configuration (e.g., an RRC configuration and a MAC CE) about the first and the second spatial relation associated with the first and the second PUCCH resources, respectively.

Embodiment 34: The method of any one of embodiments 19 to 33a, wherein different modulation and coding schemes, MCSs, and/or different redundancy versions, RVs, and/or different time and frequency resource allocations, and/or different spatial layers are indicated in the first and the second DCI messages.

Embodiment 35: The method of any of the previous embodiments, further comprising: obtaining user data; and forwarding the user data to a host computer or a wireless communication device.

Group C Embodiments

Embodiment 36: A wireless communication device comprising: processing circuitry configured to perform any of the steps of any of the Group A embodiments; and power supply circuitry configured to supply power to the wireless communication device.

Embodiment 37: A base station comprising: processing circuitry configured to perform any of the steps of any of the Group B embodiments; and power supply circuitry configured to supply power to the base station.

Embodiment 38: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 39: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 40: The communication system of the previous embodiment further including the base station.

Embodiment 41: The communication system of the previous 2 embodiments, further including the UE, wherein the UE is configured to communicate with the base station.

Embodiment 42: The communication system of the previous 3 embodiments, wherein: the processing circuitry of the host computer is configured to execute a host application, thereby providing the user data; and the UE comprises processing circuitry configured to execute a client application associated with the host application.

Embodiment 43: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 44: The method of the previous embodiment, further comprising, at the base station, transmitting the user data.

Embodiment 45: The method of the previous 2 embodiments, wherein the user data is provided at the host computer by executing a host application, the method further comprising, at the UE, executing a client application associated with the host application.

Embodiment 46: A User Equipment, UE, configured to communicate with a base station, the UE comprising a radio interface and processing circuitry configured to perform the method of the previous 3 embodiments.

Embodiment 47: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 48: The communication system of the previous embodiment, wherein the cellular network further includes a base station configured to communicate with the UE.

Embodiment 49: The communication system of the previous 2 embodiments, wherein: the processing circuitry of the host computer is configured to execute a host application, thereby providing the user data; and the UE's processing circuitry is configured to execute a client application associated with the host application.

Embodiment 50: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 51: The method of the previous embodiment, further comprising at the UE, receiving the user data from the base station.

Those skilled in the art will recognize improvements and modifications to the embodiments of the present disclosure. All such improvements and modifications are considered within the scope of the concepts disclosed herein.

The invention claimed is:

1. A method performed by a User Equipment, UE, for reliable data transmission with multiple Downlink Control Information, DCI, messages scheduling multiple Physical Downlink Shared Channel, PDSCH, transmissions for a same Transport Block, TB, in a cellular communications system, the method comprising:
receiving a first Physical Downlink Control Channel, PDCCH, carrying a first DCI message in a first Control Resource Set, CORESET, in a first time period, t1, and a second PDCCH carrying a second DCI message in a second CORESET in a second time period, t2, wherein t1≤t2;
receiving a first PDSCH scheduled by the first DCI message in a third time period, t3, and a second PDSCH scheduled by the second DCI message in a fourth time period, t4, wherein the first PDSCH and the second PDSCH are associated with a same Hybrid Automatic Repeat Request, HARQ, process and a same TB, and t3≤t4;
sending a first HARQ ACK/NACK in a first Physical Uplink Control Channel, PUCCH, resource according to a first configured PUCCH spatial relation in a fifth time period, t5, and a second HARQ ACK/NACK in a second PUCCH resource according to a second configured PUCCH spatial relation in a sixth time period, t6, wherein t5≤t6 and t4≤t5.

2. The method of claim 1, wherein the second PDSCH is received before the first HARQ ACK/NACK is sent.

3. The method of claim 1, wherein the first CORESET and the second CORESET are configured with a first Transmission Configuration Indicator, TCI, state and a second TCI state, respectively.

4. The method of claim 3, wherein the first TCI state and the second TCI state are different.

5. The method of claim 3, wherein a third TCI state is indicated in the first DCI message for the first PDSCH and a fourth TCI state is indicated in the second DCI message for the second PDSCH, and the third and the fourth TCI states are different.

6. The method of claim 5, wherein the first TCI state is the same as the third TCI state, and the second TCI state is the same as the fourth TCI state.

7. The method of claim 1, wherein a same HARQ process identifier is indicated in the first DCI message and the second DCI message, thereby associating the first PDSCH and the second PDSCH with the same HARQ process.

8. The method of claim 7, wherein a same New Data Indicator, NDI, is comprised in the first and second DCI messages.

9. The method of claim 8, further comprising determining that the first and second PDSCH carry the same TB.

10. The method of claim 1, wherein the first PUCCH resource is determined by at least a first PUCCH resource indicator, PRI, in the first DCI message, and the second PUCCH resource is determined by at least a second PRI in the second DCI message.

11. The method of claim 1, wherein the first configured PUCCH spatial relation and the second configured PUCCH spatial relation are different.

12. The method of claim 1, further comprising receiving a configuration of the first configured PUCCH spatial relation and the second configured PUCCH spatial relation, each comprising a reference signal indicating a transmit direction and/or a spatial filter to use, a downlink reference signal for pathloss calculation, and power control parameters.

13. The method of claim 1, further comprising receiving a Radio Resource Control, RRC, configuration of a list of TCI states for PDSCH.

14. The method of claim 1, further comprising receiving a Radio Resource Control, RRC, configuration of one or more TCI states for the first CORESET and one or more TCI states for the second CORESET.

15. The method of claim 1, further comprising receiving a TCI state activation Medium Access Control, MAC, Control Element, CE, in activating a subset of TCI states for PDSCH including the third TCI state and the fourth TCI state from the list of TCI states.

16. The method of claim 1, further comprising receiving a first TCI state activation Medium Access Control, MAC, Control Element, CE, in activating the first TCI state for the first CORESET and a second MAC CE in activating the second TCI state for the second CORESET.

17. The method of claim 1, wherein the first HARQ ACK/NACK is associated to the first PDSCH, and the second HARQ ACK/NACK is associated to the second PDSCH.

18. The method of claim 1, wherein the second HARQ ACK/NACK is associated to both the first PDSCH and the second PDSCH, wherein an ACK is sent when one of the first PDSCH and the second PDSCH is decoded successfully.

19. A User Equipment, UE, for reliable data transmission with multiple Downlink Control Information, DCI, messages scheduling multiple Physical Downlink Shared Channel, PDSCH, transmissions for a same Transport Block, TB, in a cellular communications system, the UE comprising:
one or more transmitters;
one or more receivers; and
processing circuitry associated with the one or more transmitters and the one or more receivers, the processing circuitry configured to cause the UE to:
receive a first Physical Downlink Control Channel, PDCCH, carrying a first DCI message in a first Control Resource Set, CORESET, in a first time period, t1, and a second PDCCH carrying a second DCI message in a second CORESET in a second time period, t2, wherein t1≤t2;

receive a first PDSCH scheduled by the first DCI message in a third time period, t3, and a second PDSCH scheduled by the second DCI message in a fourth time period, t4, wherein the first PDSCH and the second PDSCH are associated with a same Hybrid Automatic Repeat Request, HARQ, process and a same TB, and t3≤t4;

send a first Hybrid Automatic Repeat Request, HARQ, ACK/NACK in a first Physical Uplink Control Channel, PUCCH, resource according to a first configured PUCCH spatial relation in a fifth time period, t5, and a second HARQ ACK/NACK in a second PUCCH resource according to a second configured PUCCH spatial relation in a sixth time period, t6, wherein t5≤t6 and t4≤t5.

20. A method performed by one or more transmission and reception points, TRPs, the method comprising:

transmitting, to a User Equipment, UE, a first Physical Downlink Control Channel, PDCCH, carrying a first Downlink Control Information, DCI, message in a first Control Resource Set, CORESET, in a first time period, t1, and a second PDCCH carrying a second DCI message in a second CORESET in a second time period, t2, wherein t1≤t2;

transmitting, to the UE, a first Physical Downlink Shared Channel, PDSCH, scheduled by the first DCI message in a third time period, t3, and a second PDSCH scheduled by the second DCI message in a fourth time period, t4, wherein the first and the second PDSCH are associated with a same Hybrid Automatic Repeat Request, HARQ, process and a same Transport Block, TB, and t3≤t4; and receiving, from the UE, a first HARQ ACK/NACK in a first Physical Uplink Control Channel, PUCCH, resource with a first configured spatial relation in a fifth time period, t5, and a second HARQ ACK/NACK in a second PUCCH resource with a second configured spatial relation in a sixth time period, t6, wherein t5≤t6 and t4≤t5.

* * * * *